US012668072B2

(12) United States Patent
Suzuki

(10) Patent No.: US 12,668,072 B2
(45) Date of Patent: Jun. 30, 2026

(54) TRANSPORT PATH, RECORDING DEVICE, RECORDING SYSTEM, AND TRANSPORT DEVICE

(71) Applicant: SEIKO EPSON CORPORATION, Tokyo (JP)

(72) Inventor: Yuto Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 18/316,316

(22) Filed: May 12, 2023

(65) Prior Publication Data

US 2023/0364931 A1 Nov. 16, 2023

(30) Foreign Application Priority Data

May 13, 2022 (JP) ................................. 2022-079279

(51) Int. Cl.
*B41J 13/00* (2006.01)
*B65H 5/06* (2006.01)

(52) U.S. Cl.
CPC .......... *B41J 13/0009* (2013.01); *B65H 5/062* (2013.01); *B65H 2404/14* (2013.01); *B65H 2404/19* (2013.01); *B65H 2801/06* (2013.01)

(58) Field of Classification Search
CPC .... B41J 13/00; B41J 13/0009; B41J 13/0036; B41J 13/0027; B41J 29/393; G03G 15/6529; G03G 2215/00675; G03G 2215/00679; G03G 15/234; B65H 2402/10
See application file for complete search history.

(56) References Cited

U.S. PATENT DOCUMENTS

2009/0285586 A1 11/2009 Kawaguchi
2015/0273892 A1* 10/2015 Tanjo ........................ B41J 29/02 347/104

FOREIGN PATENT DOCUMENTS

| | | |
|---|---|---|
| JP | H02124962 | 10/1990 |
| JP | 2006321650 | 11/2006 |
| JP | 2009-276604 A | 11/2009 |
| JP | 2013-033120 A | 2/2013 |
| JP | 2017109863 | 6/2017 |
| JP | 2021088447 | 6/2021 |

* cited by examiner

*Primary Examiner* — Kristal Feggins
(74) *Attorney, Agent, or Firm* — WORKMAN NYDEGGER

(57) ABSTRACT

The transport path TR is a transport path TR for transporting the medium P in the transport direction, the transport path TR including path members XP that guide the medium P and that are arranged in the X-axis direction, which intersects the transport direction, wherein the path members XP are configured so that positions where the path members XP are provided are mutually switchable.

15 Claims, 22 Drawing Sheets

TRANSPORT PATH, RECORDING DEVICE, RECORDING SYSTEM, AND TRANSPORT DEVICE

The present application is based on, and claims priority from JP Application Serial Number 2022-079279, filed May 13, 2022, the disclosure of which is hereby incorporated by reference herein in its entirety.

BACKGROUND

1. Technical Field

The present disclosure relates to a transport path, a recording device, a recording system, and a transport device.

2. Related Art

JP-A-2009-276604 discloses an image forming device, as an example of a recording device including a sheet feed roller unit for transporting recording papers. It is disclosed that, in this image forming device, when switching a part by a user is necessary based on a wear rate of the sheet feed roller unit and the utilization rate of the sheet feed stage, a notification is performed to prompt replacement of the sheet feed roller unit. Recording paper is an example of a medium.

However, in a transport path, the degree of wear of the path member may be different in the width direction of the transport path. Therefore, similarly to replacement of the sheet feed roller unit disclosed in JP-A-2009-276604, when the path members constituting the transport path are replaced across the width direction of the transport path, there is a possibility that some path members that do not need replacement are also replaced.

SUMMARY

A transport path is transport path for transporting a medium in a transport direction, the transport path including path members that guide the medium and that are arranged in a path width direction of the transport path, which intersects the transport direction, wherein the path members are configured so that positions where the path members are provided are mutually switchable.

A recording apparatus includes the transport path described above; a recording section for performing recording on the medium transported along the transport path; and a control section, wherein the control section calculates a deterioration degree of performance of guiding the medium for each of the path members on the basis of recording information related to a specification of the recording and in a case where the path members includes a set-value-exceeded path member, in which the deterioration degree exceeds a set value, and a set-value-not-exceeded path member, in which the deterioration degree does not exceed the set value, then the control section performs a notification to prompt switching of the set-value-exceeded path member and the set-value-not-exceeded path member.

A recording system includes a recording device for recording on a medium; a transport device that transports the medium recorded by the recording device and that includes the transport path described above; and a control section for controlling the recording device and the transport device.

A transport device for transporting a medium recorded by a recording device, the transport device includes the transport path described above.

DESCRIPTION OF EMBODIMENTS

Figure 1:
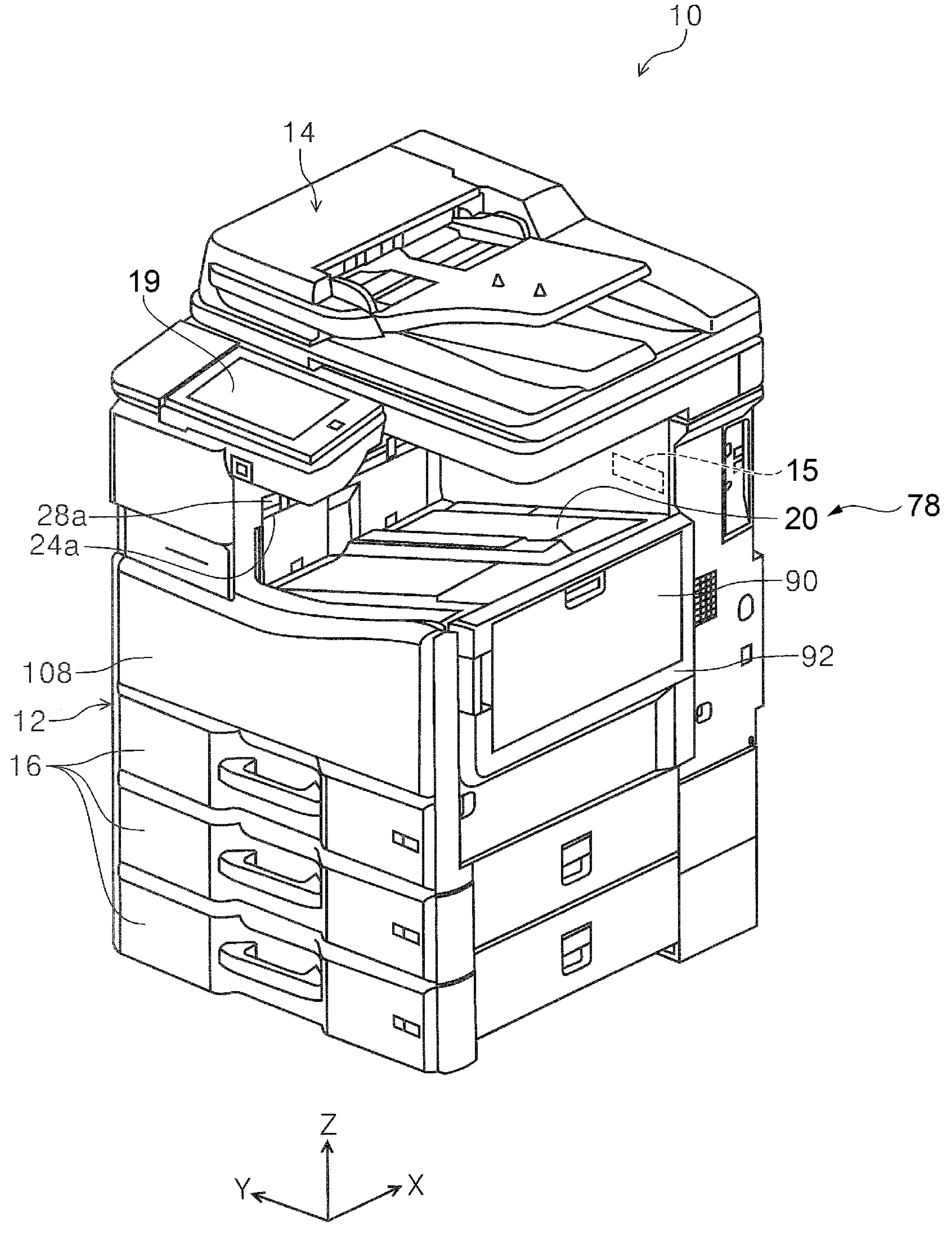
FIG. 1 is a perspective view showing an external configuration of a recording device according to first embodiment of the present disclosure.

Hereinafter, the present disclosure will be described based on embodiments. In each figure, the same members are denoted by the same reference numerals, and a repetitive description will be omitted. In the present specification, "same" and "at the same time" not only mean completely the same, but also include the same in consideration of measurement errors, the same in consideration of manufacturing variations of members, and the same in a range in which functions are not impaired. Therefore, for example, "both dimensions are the same" means that the difference between both dimensions is within ±10%, more preferably within ±5%, and particularly preferably within ±3% of one dimension in consideration of measurement errors and manufacturing variations of members.

In each figure, X, Y, and Z represents three spatial axes orthogonal to each other. In this specification, directions extending along these axes are referred to as an X-axis direction, a Y-axis direction, and a Z-axis direction. In a case where the direction is specified, positive and negative signs are used together with direction notation, that is, a positive direction is set as "+" and a negative direction is set as "−", and a direction in which an arrow in each drawing is directed is set as a +direction and a direction opposite to the arrow is set as a −direction.

The Z-axis direction indicates the gravity direction, the +Z direction indicates a vertically upward direction, and the −Z direction indicates a vertically downward direction. In addition, a plane including the X-axis and the Y-axis will be described as an X-Y plane, a plane including the X-axis and the Z-axis will be described as an X-Z plane, and a plane including the Y-axis and the Z-axis will be described as a Y-Z plane. Further, the X-Y plane is a horizontal plane. Further, the three spatial axes of X, Y, and Z, when not limited to positive or negative directions, are described as the X axis, the Y axis, and the Z axis, respectively.

In each drawing, an X-axis direction is a depth direction of a recording device 10, a path width direction of a transport path 21, and a width direction of a medium P. In the X-axis direction, a −X direction is a direction from a back surface of the recording device 10 to a front surface of the recording device 10. Further, a +X direction is a direction from the front surface of the recording device 10 to the back surface of the recording device 10.

A Y-axis direction is the width direction of the recording device 10 and is a direction along a transport direction of the medium P. In the Y-axis directions, a −Y direction is a right direction as viewed from a user when the front surface of the recording device 10 faces the user, and a +Y direction is a left direction. Further, a Z-axis direction is a height direction of the recording device 10. In the present embodiment, a side surface on which a display panel 19 is provided among the side surfaces constituting the periphery of the recording device 10 is a front surface of the recording device 10.

1. First Embodiment

As shown in FIG. 1, the recording device 10 is, for example, an inkjet printer capable of recording on the medium P. The recording device 10 is configured as a multifunction device including an device main body 12 and a scanner unit 14. The device main body 12 includes medium accommodation cassettes 16 that accommodate the medium P. Each medium accommodation cassette 16 is detachably attached from the −X direction side of the device main body 12. In the specification, the medium P refers to, as an example, paper such as plain paper, thick paper, and photographic paper. A plurality of medium accommodation cassettes 16 can accommodate medium P of different sizes.

A medium receiving tray 20 that receives the medium P on which recording is performed in a recording section 18 (to be described later) is provided between the scanner unit 14 and the medium accommodation cassette 16 in the Z-axis direction of the device main body 12. In addition, the display panel 19 capable of notifying the user is provided at a position of the device main body 12 on the −X direction side of the scanner unit 14 and on the +Z direction side of the medium receiving tray 20. The display panel 19 is an example of a notification section.

Figure 2:
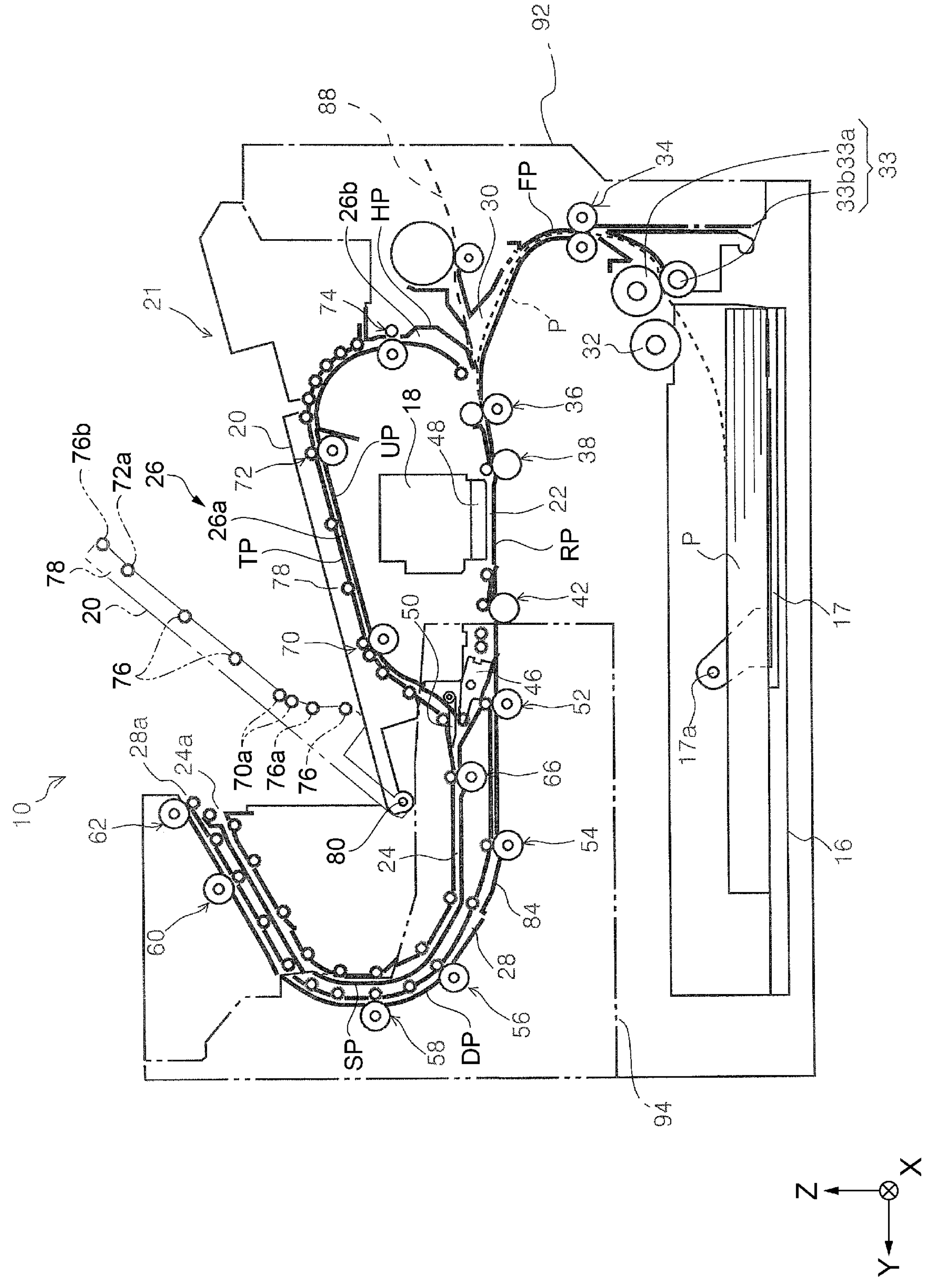
FIG. 2 is a schematic diagram showing a transport path in the recording device.
Figure 9:
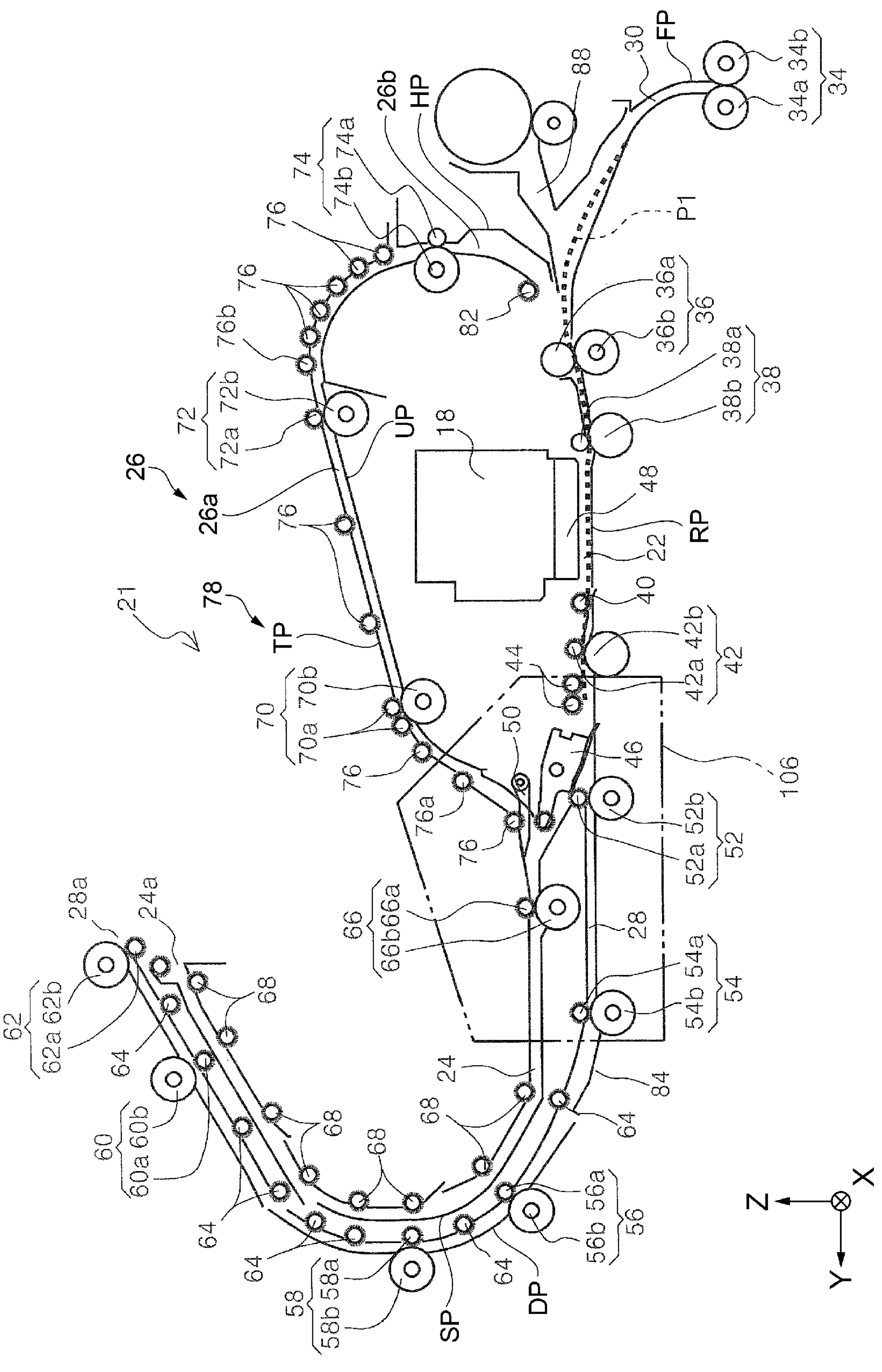
FIG. 9 is a schematic diagram showing details of the transport path.

As shown in FIGS. 2 and 9, the recording device 10 includes a transport path 21 for transporting the medium P. The transport path 21 includes a straight path 22, a switch-back path 24, an inversion path 26, a face down discharge path 28, and a feed path 30, which connects the medium accommodation cassette 16 and the straight path 22. The transport path 21 is an example of a transport path TR.

As shown in FIG. 2, the medium P accommodated in the medium accommodation cassette 16 is supported on a hopper 17 provided in the medium accommodation cassette 16. The hopper 17 pivots about a pivot shaft 17*a* provided in the hopper 17 and lifts the medium P in the +Z direction. At this time, a feed roller 32 contacts the uppermost medium P of the medium P supported by the hopper 17 and transports the medium P to the downstream side in the transport direction. At this time, a subsequent medium P might also be transported with the uppermost medium P, but a separation roller pair 33 separates the uppermost medium P from a subsequent medium P, and only the uppermost medium P is transported to the downstream side in the transport direction.

In the following description, one roller of each transport roller pair appearing in the present specification is configured as a driven roller and the other roller is configured as a driving roller rotationally driven by a drive source (not shown). Further, in the present embodiment, unless otherwise described, one roller is configured as a star wheel having a plurality of teeth on its outer periphery, and the other roller as the driving roller is configured as a rubber roller as an example. The driven roller and the driving roller are examples of a transport section that transports the medium P.

In the embodiment, each driving roller is controlled by a control section 15 provided in the device main body 12 via a drive source (not shown). A recording head 48, which will be described later, is also controlled by the control section 15. In other words, the control section 15 is configured to be capable of executing control necessary for a recording operation in the recording device 10.

The control section 15 includes a central processing unit (CPU, not shown) and a memory (not shown). The CPU can execute various programs stored in the memory, and can perform various judgments and various instructions, for example. The memory stores, for example, various programs such as a program for transporting the medium P, a program for calculating a deterioration degree D of performance for guiding the medium P for each of a plurality of path members XP (to be described later) in accordance with recording information RI, various programs such as a program relating to a display method for displaying the state of the recording device 10 on the display panel 19, various tables relating to the recording information RI, various counter values, and the like.

The control section 15 controls the entire recording device 10. For example, when recording is performed on the medium P, the control section 15 controls a recording head 48 of the recording section 18 (to be described later) and a transport section, and performs recording by ejecting ink from the recording head 48 onto the medium P transported in the transport path 21. For example, the control section 15 reads an image recorded on an original by controlling the scanner unit 14. Further, for example, the control section 15 performs a notification SC for displaying information relating to a state of the recording device 10 on the display panel 19.

A feed path 30 includes a path member FP that guides the medium P along the transport direction. The path member FP is an example of a path member XP included in the transport path TR. In the embodiment, the X-axis direction is the path width direction of the transport path TR. In the feed path 30, a feed roller 32, a separation roller pair 33, and a first transport roller pair 34 are provided in this order along the transport direction of the medium P. The feed roller 32 is driven to rotate by a drive source (not shown). One roller 33*a* of the separation roller pair 33 is a roller that is driven to rotate in a state in which a predetermined rotational resistance is applied thereto, and separates the medium P by nipping the medium P with the other roller 33*b* that is rotationally driven.

As shown in FIG. 9, one roller 34*a* of the first transport roller pair 34 is configured as a driven roller that is driven to rotate in accordance with a rotational drive of the other roller 34*b*, and the other roller 34*b* is configured as a driving roller that is rotationally driven by a drive source (not shown).

Here, description will be made on the premise of face-down discharge in which the medium P is discharged toward the medium receiving tray 20 with the recording surface of the medium P facing downward. A second transport roller pair 36 is provided downstream in the transport direction from the first transport roller pair 34. The second transport roller pair 36 also includes one roller 36*a* and an other roller 36*b*.

In the embodiment, the feed path 30 and the straight path 22 are connected at the position of the second transport roller pair 36. In other words, the feed path 30 is set as a path from the medium accommodation cassette 16 to the second transport roller pair 36.

The straight path 22 includes a path member RP for guiding the medium P along the transport direction, and is configured as a path that extends linearly. The path member RP is an example of the path member XP included in the transport path TR. In the straight path 22, a second transport roller pair 36, a third transport roller pair 38, a recording section 18, a star wheel 40, a fourth transport roller pair 42, star wheels 44, and a first flap 46 are provided in this order along the transport direction. In the embodiment, the straight path 22 is set as a path from the second transport roller pair 36 to the first flap 46. That is, the straight path 22 is set as a path that passes by the recording section 18 and extends to the upstream side in the transport direction and the downstream side in the transport direction of the recording section 18.

The third transport roller pair 38 includes one roller 38*a* and an other roller 38*b*. The recording section 18 includes a recording head 48. The recording head 48 is configured to perform recording by ejecting ink onto the recording surface of the medium P when the medium P is transported to a position facing the recording head 48. The recording head 48 of the present embodiment is a recording head in which nozzles that eject ink are provided so as to cover the entire width direction area of the medium P, and is configured as a so-called line head capable of recording on the entire width direction area of the medium P without moving in the X-axis direction.

Subsequently, a first flap 46 is provided on the downstream side of the star wheels 44 in the transport direction. The first flap 46 is configured to be switchable by a drive mechanism controlled by the control section 15 so as to connect the straight path 22 and the switchback path 24, or to connect the straight path 22 and the face down discharge path 28. In the present embodiment, the drive mechanism for driving the first flap 46 is constituted by a solenoid.

When the straight path 22 and the switchback path 24 are connected by the first flap 46, the medium P is fed by the fourth transport roller pair 42 from the straight path 22 to the switchback path 24. When the straight path 22 and the face down discharge path 28 are connected, the medium P is fed by the fourth transport roller pair 42 from the straight path 22 to the face down discharge path 28.

A second flap 50 is provided in the +Z direction from the first flap 46 with respect to the Z-axis direction. The second flap 50 is driven by an interlocking mechanism (not shown) in conjunction with an operation of the first flap 46. In other words, the second flap 50 is controlled by the control section 15 via the first flap 46 and the above-described interlocking mechanism.

In a state in which the first flap 46 connects the straight path 22 and the switchback path 24, the second flap 50 takes a posture of blocking the connection between the switchback path 24 and the inversion path 26. On the other hand, in a state in which the first flap 46 connects the straight path 22 and the face down discharge path 28, the second flap 50 takes a posture of connecting the switchback path 24 and the inversion path 26.

The face down discharge path 28 extends in the +Z direction from the straight path 22 in the Z-axis direction and is curved and inverted. The face down discharge path 28 includes a fifth transport roller pair 52, a sixth transport roller pair 54, a seventh transport roller pair 56, an eighth transport roller pair 58, a ninth transport roller pair 60, a tenth transport roller pair 62, a plurality of star wheels 64, and a path member DP for guiding the medium P along the transport direction. The path member DP is an example of the path member XP included in the transport path TR.

The face down discharge path 28 extends from the first flap 46 to an outlet 28*a* located downstream in the transport direction from the tenth transport roller pair 62. In other words, the face down discharge path 28 is a transport path that is connected to the straight path 22, and is a path through which the medium P passing through the recording section 18 is curved, inverted, and discharged.

The medium P on which recording is performed on the recording surface in the recording section 18 is sequentially nipped and transported by the fifth transport roller pair 52, the sixth transport roller pair 54, the seventh transport roller pair 56, the eighth transport roller pair 58, the ninth transport roller pair 60, and the tenth transport roller pair 62 in this order along the transport direction from the first flap 46 in the face down discharge path 28. And, the medium P is discharged from the outlet 28*a* toward the medium receiving tray 20.

Here, when the medium P is transported through the face down discharge path 28, the medium P is transported with the recording surface last recorded by the recording section 18 facing in the +Z direction, then is transported with the recording surface curved toward the inside of the curved portion of the face down discharge path 28, and is discharged from the outlet 28*a* toward the medium receiving tray 20 with the recording surface facing the −Z direction.

One roller 52*a* of the fifth transport roller pair 52, one roller 54*a* of the sixth transport roller pair 54, one roller 56*a* of the seventh transport roller pair 56, one roller 58*a* of the eighth transport roller pair 58, one roller 60*a* of the ninth transport roller pair 60, one roller 62*a* of the tenth transport roller pair 62, and a plurality of star wheels 64 are arranged on the inner side of the curve of the face down discharge path 28, that is, on the side opposite to the recording surface recorded last in the recording section 18.

Further, the other roller 52*b* of the fifth transport roller pair 52, the other roller 54*b* of the sixth transport roller pair 54, the other roller 56*b* of the seventh transport roller pair 56, the other roller 58*b* of the eighth transport roller pair 58, the other roller 60*b* of the ninth transport roller pair 60, and the other roller 62*b* of the tenth transport roller pair 62 are arranged on the outer side of curve of the face down discharge path 28, that is, on the side opposite to the side facing the recording surface recorded last in the recording section 18.

As shown in FIG. 2, the medium receiving tray 20 is configured to take an upward inclined posture in the +Z direction toward the side far from the outlet 28*a* of the face down discharge path 28, that is, toward the −Y direction side, so that the medium P discharged from the face down discharge path 28 can be placed on the medium receiving tray 20. In the embodiment, the medium receiving tray 20 is located on the +Z direction side of the recording section 18 in the Z-axis direction.

As shown in FIG. 9, the switchback path 24 and the inversion path 26 are paths through which the medium P passes when recording is performed on the second surface after recording is performed on the first surface of the medium P, that is, when double-sided recording is performed. Similarly, when recording is not performed on the first surface but recording is performed on the second surface, the medium P passes through the switchback path 24 and the inversion path 26.

The switchback path 24 is located inside the face down discharge path 28 that is curved and inverted in the +Z direction in the Z-axis direction, and extends along the face down discharge path 28. The switchback path 24 includes an eleventh transport roller pair 66 and a plurality of star wheels 68. Further, the switchback path 24 includes a path member SP that guides the medium P along the transport direction. The path member SP is an example of the path member XP included in the transport path TR. One roller 66*a* of the eleventh transport roller pair 66 and the plurality of star wheel 68 are arranged on an inner side in the curved direction of the switchback path 24. The other roller 66*b* of the eleventh transport roller pair 66 is arranged on an outer side in the curved direction of the switchback path 24.

Further, in the present embodiment, the switchback path 24 is set as a path from the second flap 50 to the opening 24*a* provided at a tip of the switchback path 24. As shown in FIG. 9, when the switchback path 24 and the straight path 22 are connected by the first flap 46, the medium P is fed by the fourth transport roller pair 42 from the recording section 18 to the switchback path 24 via the first flap 46. The medium P is fed in the switchback path 24 to a position where the rear end portion in the transport direction is nipped by the eleventh transport roller pair 66.

When the first flap 46 is switched from a posture in which the straight path 22 and the switchback path 24 are connected to a posture in which the straight path 22 and the switchback path 24 are disconnected, the second flap 50 is switched to a posture in which the switchback path 24 and the inversion path 26 are connected.

Accordingly, the control section 15 rotates the eleventh transport roller pair 66 in a direction opposite to the direction in which the medium P is sent to the switchback path 24, and sends the medium P to the inversion path 26 with the rear end side of the medium P as the front end side. In other words, the medium P is switched back. Therefore, the switchback path 24 is a transport path that is connected to the straight path 22, and is a path in which the medium P that passes through the recording section 18 is fed and then switched back and transported in a direction opposite to the feeding direction.

As shown in FIG. 9, the inversion path 26 is set as a path from the second flap 50 through the +Z direction side of the recording section 18 to the second transport roller pair 36 of the straight path 22.

The inversion path 26 includes a twelfth transport roller pair 70, a thirteenth transport roller pair 72, a fourteenth transport roller pair 74, and a plurality of star wheels 76. In the inversion path 26, the other roller 70*b* of the twelfth transport roller pair 70, the other roller 72*b* of the thirteenth transport roller pair 72, and the other roller 74*b* of the fourteenth transport roller pair 74 are provided inside the transport path with respect to the recording section 18, that is, closer to the recording section 18. One roller 70*a* of the twelfth transport roller pair 70, one roller 72*a* of the thirteenth transport roller pair 72, one roller 74*a* of the fourteenth transport roller pair 74, and the star wheel 76 are provided outside the transport path.

Further, in the present embodiment, a section from the star wheel denoted by reference symbol 76*a* to the star wheel denoted by reference symbol 76*b* via the twelfth transport roller pair 70 and the thirteenth transport roller pair 72 is referred to as an upper area 26*a*, and a section from the star wheel denoted by reference symbol 76*b* to the second transport roller pair 36 is referred to as an inversion section 26*b*.

The inversion path 26 also includes path members TP, UP, HP for guiding the medium P along the transport direction. The path member TP is located on the +Z direction side of the upper area 26*a* and forms the +Z direction side of the upper area 26*a*. The path member UP is located on the −Z direction side of the upper area 26*a* and forms the −Z direction side of the upper area 26*a*. The path member HP forms the inversion section 26*b*. The path members TP, UP, HP are examples of the path members XP included in the transport path TR.

As shown in FIG. 2, the inversion path 26 includes an upper member 78 on the +Z direction side of the inversion path 26. The upper member 78 is provided with the path member TP that forms the +Z direction side of the upper area 26*a*. A medium receiving tray 20 is formed on the +Z direction side of the upper member 78. That is, an upper surface of the upper member 78 constitutes the medium receiving tray 20, and a lower surface thereof constitutes a part of the upper area 26*a*.

Further, the upper member 78 is provided with a pivot fulcrum 80 at an end portion on the +Y direction side. Therefore, the upper member 78 can take a closed posture (refer to a solid line section in FIG. 2) in which the upper area 26*a* is formed and a posture (refer to a two dot chain line section in FIG. 2) in which the upper area 26*a* is open. A pivot of the upper member 78 will be described in detail later.

In the inversion path 26, star wheels 76, 76*a*, 76*b*, a roller 70*a* of the twelfth transport roller pair 70, and a roller 72*a* of the thirteenth transport roller pair 72, which are located in the upper area 26*a*, are rotatably attached to the upper member 78.

The outlet side of the inversion section 26*b* is configured to merge with the straight path 22 at a position upstream in the transport direction of the second transport roller pair 36 in the straight path 22. Then, the medium P is fed into the straight path 22 again. In other words, the inversion path 26 is a transport path connected to the switchback path 24, and is set as a path in which the medium P transported in the reverse direction, i.e., switched back, is reversed by bypassing through the +Z direction side of the recording section 18, and merges at the second transport roller pair 36, which is located in the straight path 22 on the upstream side in the transport direction of the recording section 18.

The above is an outline of the transport path 21 when face down discharge is executed to the medium receiving tray 20 in the recording device 10. In the present embodiment, when the recording device 10 performs double-sided recording on the medium P, i.e., performs recording on the first and second sides of the medium P, the transport path 21 of the medium P is from the medium accommodation cassette 16 through the straight path 22, the recording section 18, the switchback path 24, and the inversion path 26, through the straight path 22 and the recording section 18 again and reaches the medium receiving tray 20 through the face down discharge path 28.

Further, the recording device 10 according to the present embodiment is configured to be capable of face up discharge. As shown in FIG. 9, a part of the path member between the other roller 54*b* of the sixth transport roller pair 54 and the other roller 56*b* of the seventh transport roller pair 56 in the face down discharge path 28 is configured as a third flap 84. The third flap 84 is configured to be capable of switching between a posture constituting a transport path of the face down discharge path 28 (see FIGS. 2 and 9) and a face up discharge posture (not shown). In the embodiment, the third flap 84 is controlled by the control section 15.

Figure 5:
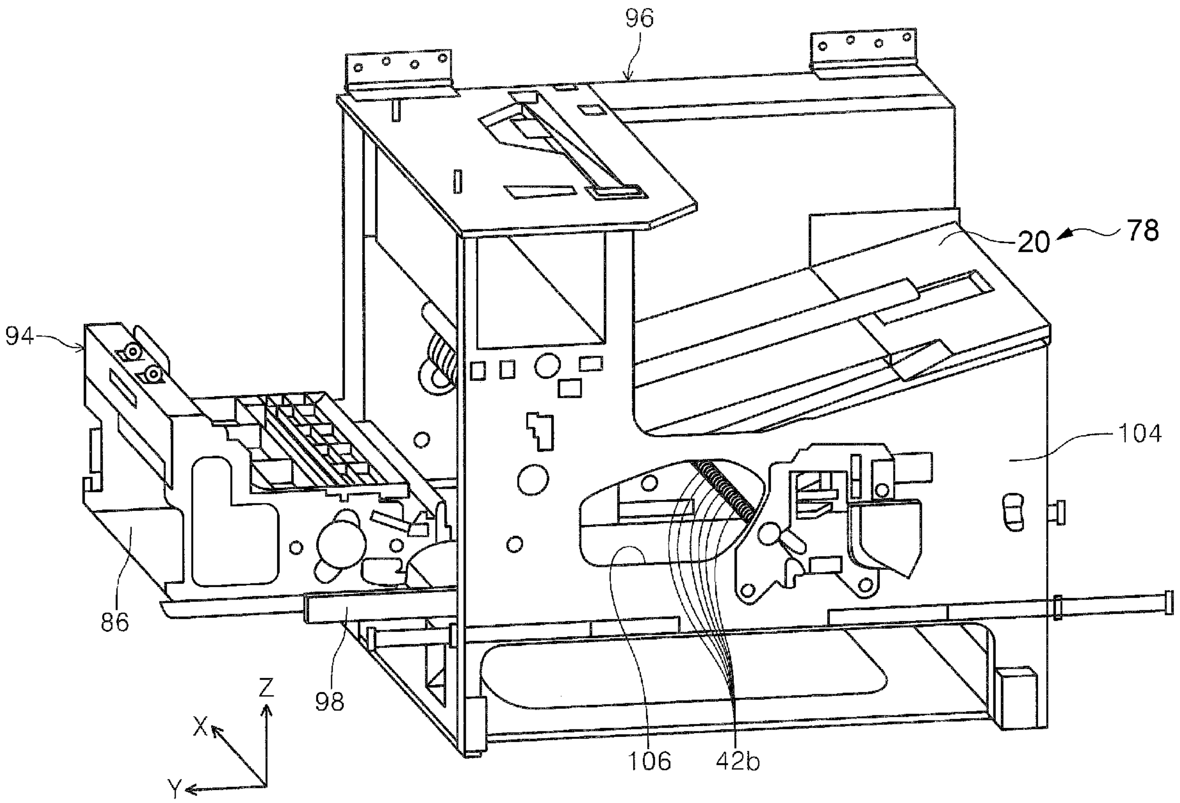
FIG. 5 is a perspective view showing a body structure in a state where a slide section is pulled out.

By switching the third flap 84 to the face up discharge posture, the medium P sent from the straight path 22 to the face down discharge path 28 is discharged to a face up discharge tray 86 shown in FIG. 5 via the third flap 84 with the recording surface of the medium P facing in the +Z direction.

In FIG. 2, a broken line denoted by reference numeral 88 indicates a manual feed path 88 of the medium P supplied from a manual feed tray 90 in a state in which the manual feed tray 90 (refer to FIG. 1) is pivoted and open with respect to the device main body 12. The manual feed path 88 is configured to merge with the feed path 30. Accordingly, the recording device 10 is configured to be capable of performing both single-sided recording and double-sided recording on the medium P supplied from the manual feed path 88.

Next, configuration that enables handling of a paper jam of the medium P occurring in the transport path 21 in the device main body 12 and access to the path members FP, RP, DP, SP, TP, UP, HP configuring the transport path 21 will be described.

Figure 3:
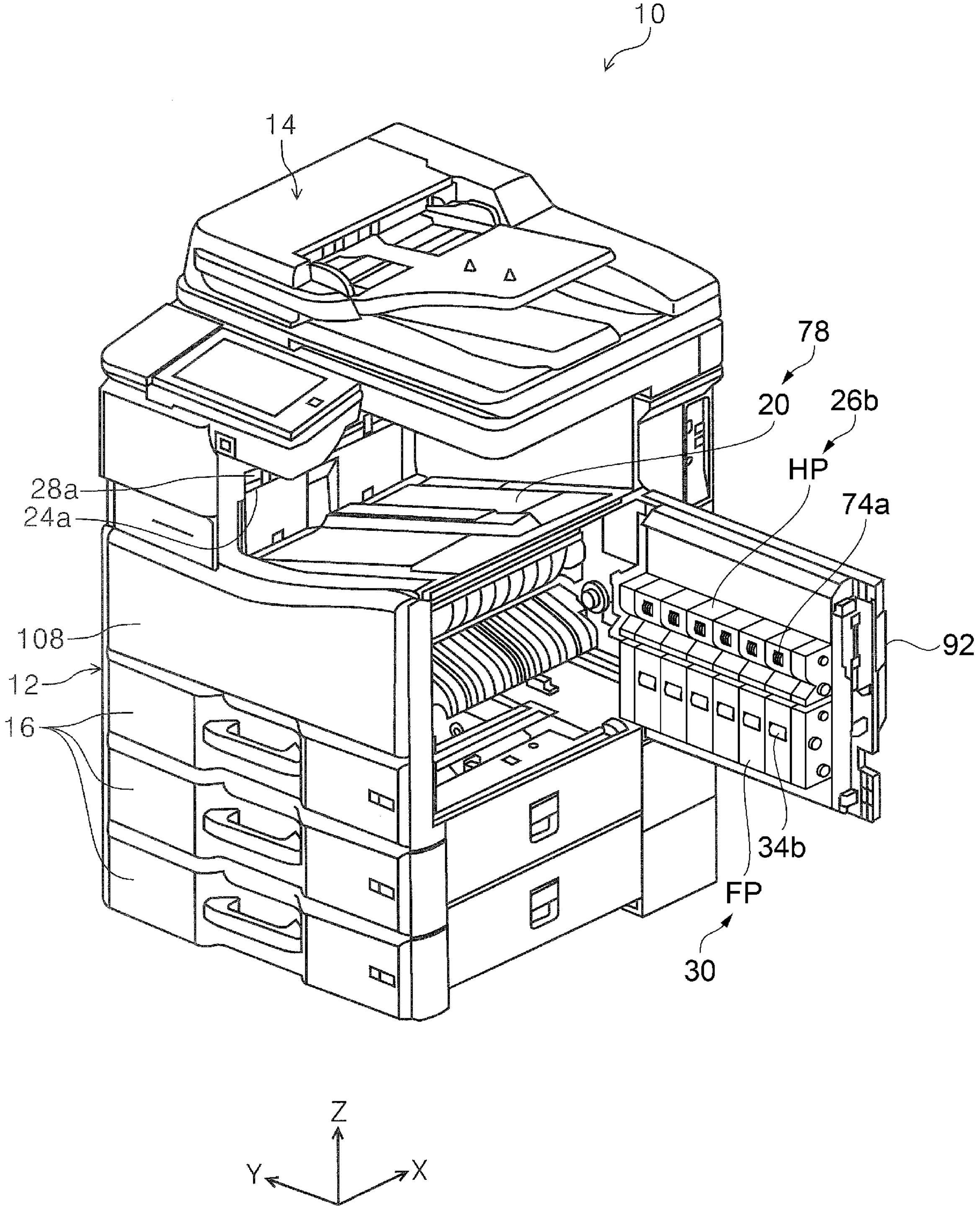
FIG. 3 is a perspective view showing the recording device in a state where an opening and closing section is open.
Figure 10:
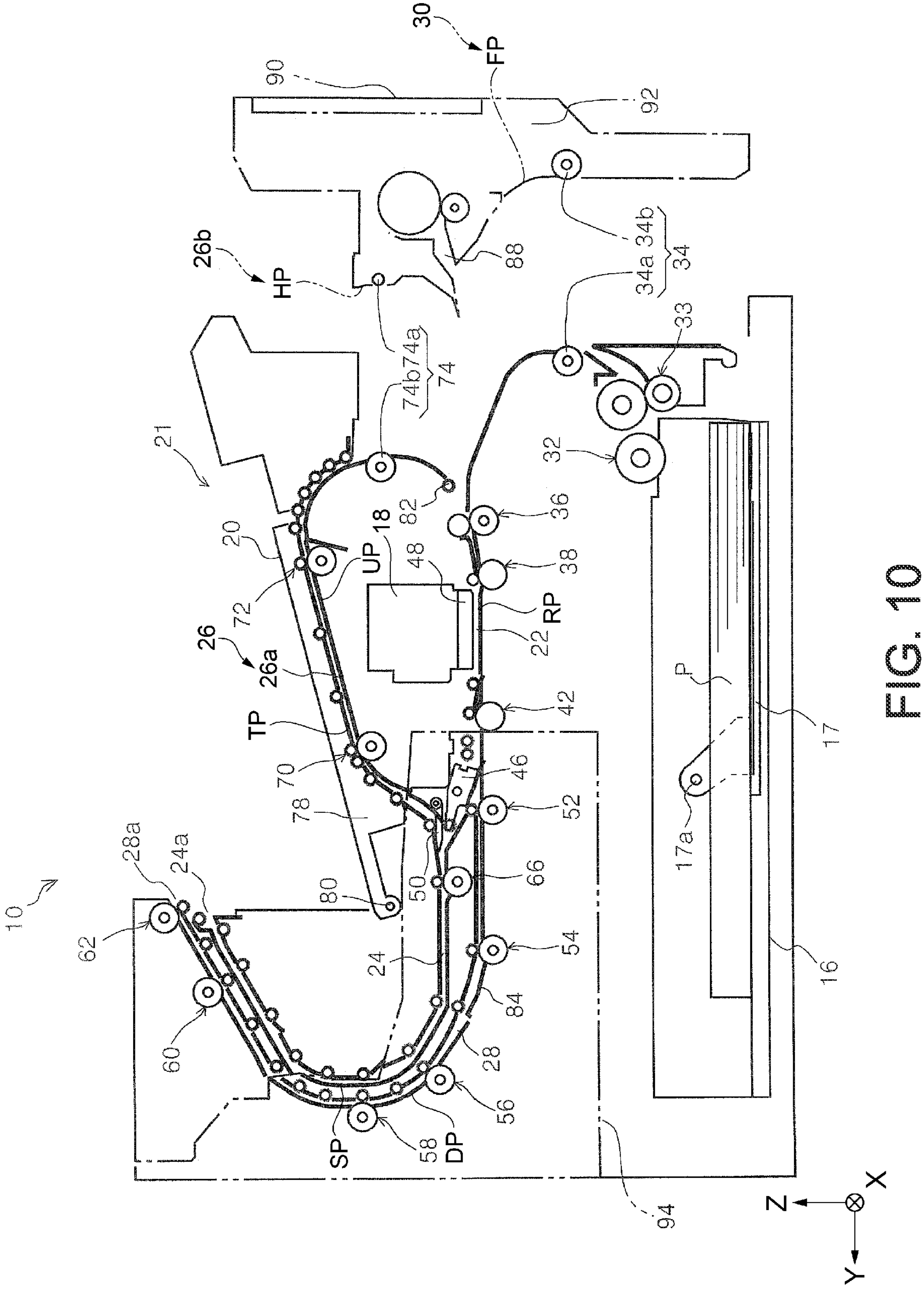
FIG. 10 is a schematic diagram showing the transport path when the opening and closing section is open.

First, the feed path 30 and the inversion section 26*b* of the inversion path 26 will be described. In FIG. 10, the single dot chain line section denoted by reference numeral 92 indicates an opening and closing section 92 which can be opened and closed with respect to the device main body 12. In FIG. 10, the opening and closing section 92 is shown in a state of being moved in the horizontal direction from the transport path 21 for the sake of explanation. The opening and closing section 92 can take a closed state with respect to the device main body 12 as shown in FIG. 1 and an opened state with respect to the device main body 12 as shown in FIG. 3. The opening and closing section 92 has a pivot fulcrum (not shown) at an end portion on the +X direction side. The opening and closing section 92 is configured to pivot with respect to the device main body 12 about a pivot fulcrum.

Figure 4:
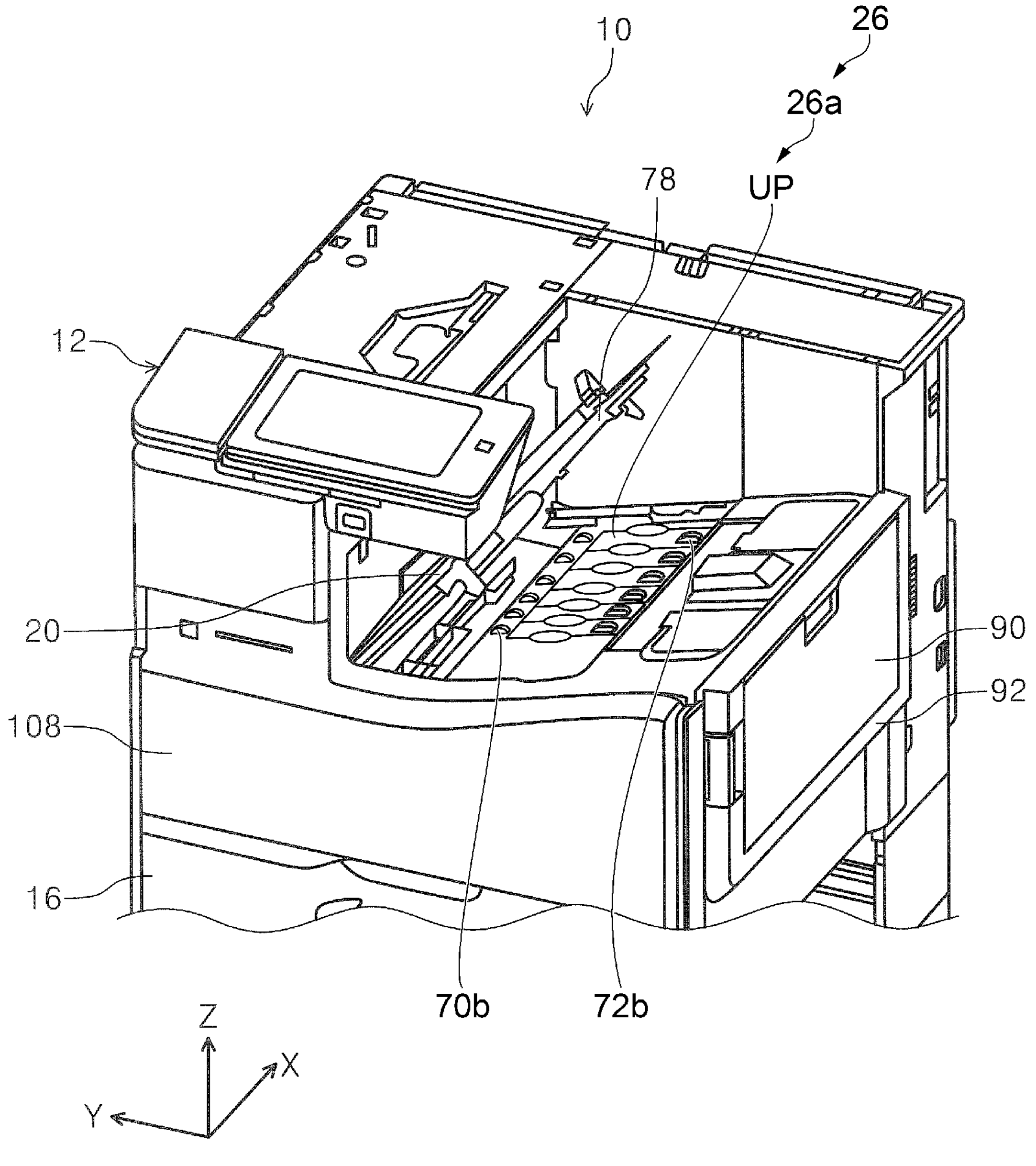
FIG. 4 is a perspective view showing the recording device in a state where a medium receiving tray is open.

As shown in FIGS. 4 and 10, the opening and closing section 92 includes a manual feed tray 90 that can be opened and closed with respect to the opening and closing section 92. Further, when the opening and closing section 92 is closed with respect to the device main body 12, as shown in FIG. 2, the opening and closing section 92 forms a path from the first transport roller pair 34 to a merging position with the manual feed path 88 in the feed path 30 and a part of the inversion section 26*b* of the inversion path 26. As shown in FIG. 10, the opening and closing section 92 includes the roller 74*a* of the fourteenth transport roller pair 74.

Therefore, as shown in FIGS. 3 and 10, when the opening and closing section 92 is open with respect to the device main body 12, a path in the feed path 30 from the first transport roller pair 34 to the merging position with the manual feed path 88 and a part of the inversion section 26*b* of the inversion path 26 are exposed to the outside of the device main body 12. At this time, as shown in FIG. 10, the one roller 34*a* and the other roller 34*b* of the first transport roller pair 34 are separated from each other, and the nip state in the first transport roller pair 34 is eliminated. Therefore, medium P clogging the feed path 30 can be easily removed. Further, the user can access the path member FP constituting the feed path 30.

Similarly, since the one roller 74*a* and the other roller 74*b* of the fourteenth transport roller pair 74 are separated from each other, the nip state in the fourteenth transport roller pair 74 is eliminated. Therefore, medium P clogging the inversion section 26*b* of the inversion path 26 can be easily removed. Further, the user can access the path member HP constituting the inversion section 26*b* of the inversion path 26.

Figure 11:
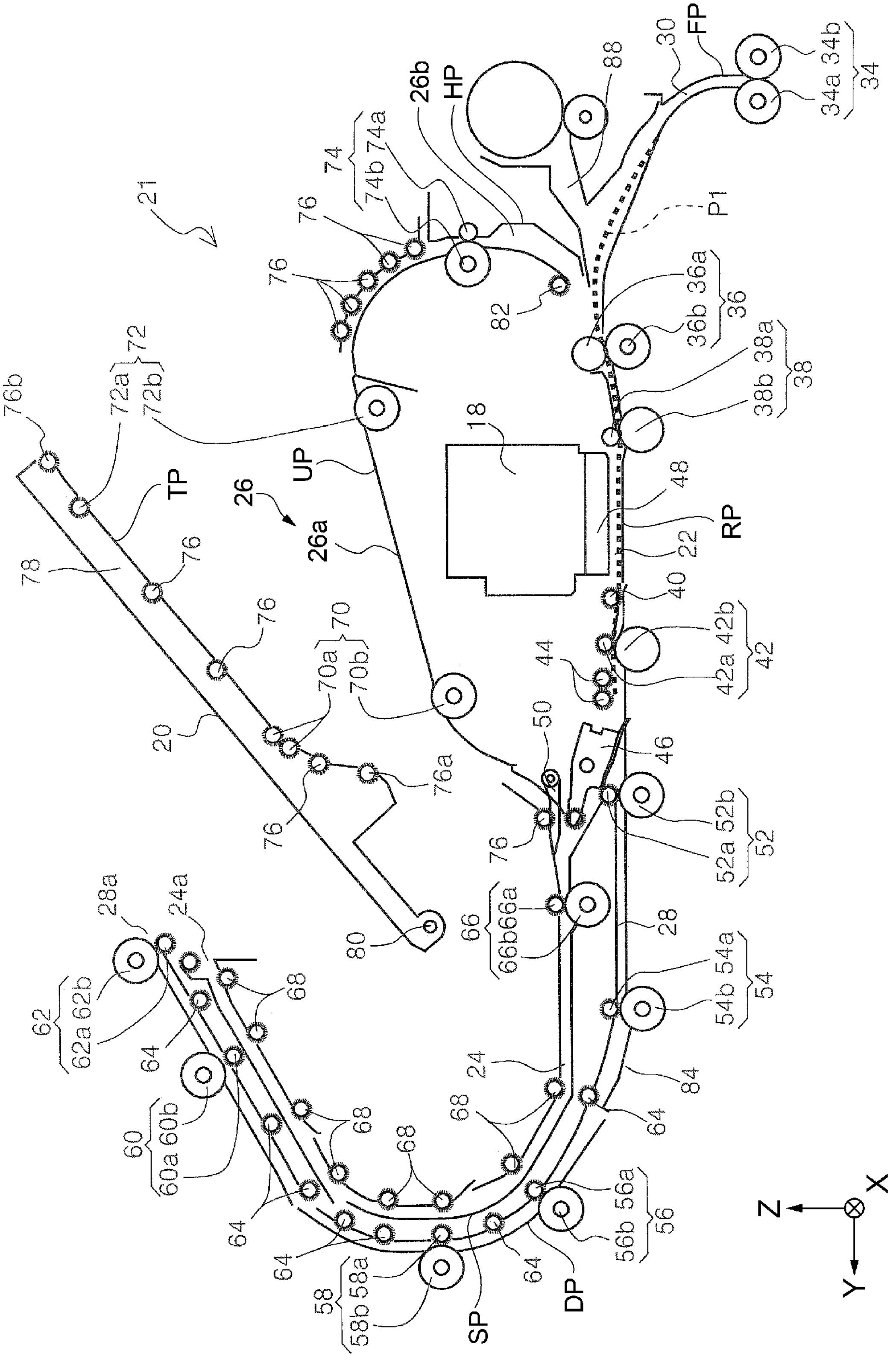
FIG. 11 is a schematic diagram showing the transport path when the medium receiving tray is open.

Next, the upper area 26*a* of the inversion path 26 will be described. As shown in FIGS. 10 and 11, the upper member 78 can be pivoted in the +Z direction side, with the pivot fulcrum 80 provided at the end portion on the +Y direction side as a fulcrum, from a closed state with respect to the device main body 12 to an opened state with respect to the device main body 12.

When the upper member 78 is open with respect to the device main body 12, the upper area 26*a* of the inversion path 26 is open. In other words, the upper area 26*a* of the inversion path 26 is exposed to the outside of the device main body 12. Further, the roller 70*a* and the roller 70*b* of the twelfth transport roller pair 70 arranged in the upper area 26*a* are separated from each other, and the nip state in the twelfth transport roller pair 70 is eliminated. Similarly, the roller 72*a* and the roller 72*b* of the thirteenth transport roller pair 72 arranged in the upper area 26*a* are separated from each other, and the nip state in the thirteenth transport roller pair 72 is eliminated.

Since the star wheels 76, 76*a*, 76*b* arranged in the upper area 26*a* are provided on the upper member 78, when the upper member 78 is pivoted, only the roller 70*b* of the twelfth transport roller pair 70 and the roller 72*b* of the thirteenth transport roller pair 72 that support the −Z direction side of the medium P in the Z axis direction remain in the upper area 26*a*. Therefore, since there is nothing that blocks the +Z direction side of the upper area 26*a*, it is possible to easily perform a paper jam recovery process of the medium P. Further, the user can access the path members TP, UP constituting the upper area 26*a* of the inversion path 26.

Figure 12:
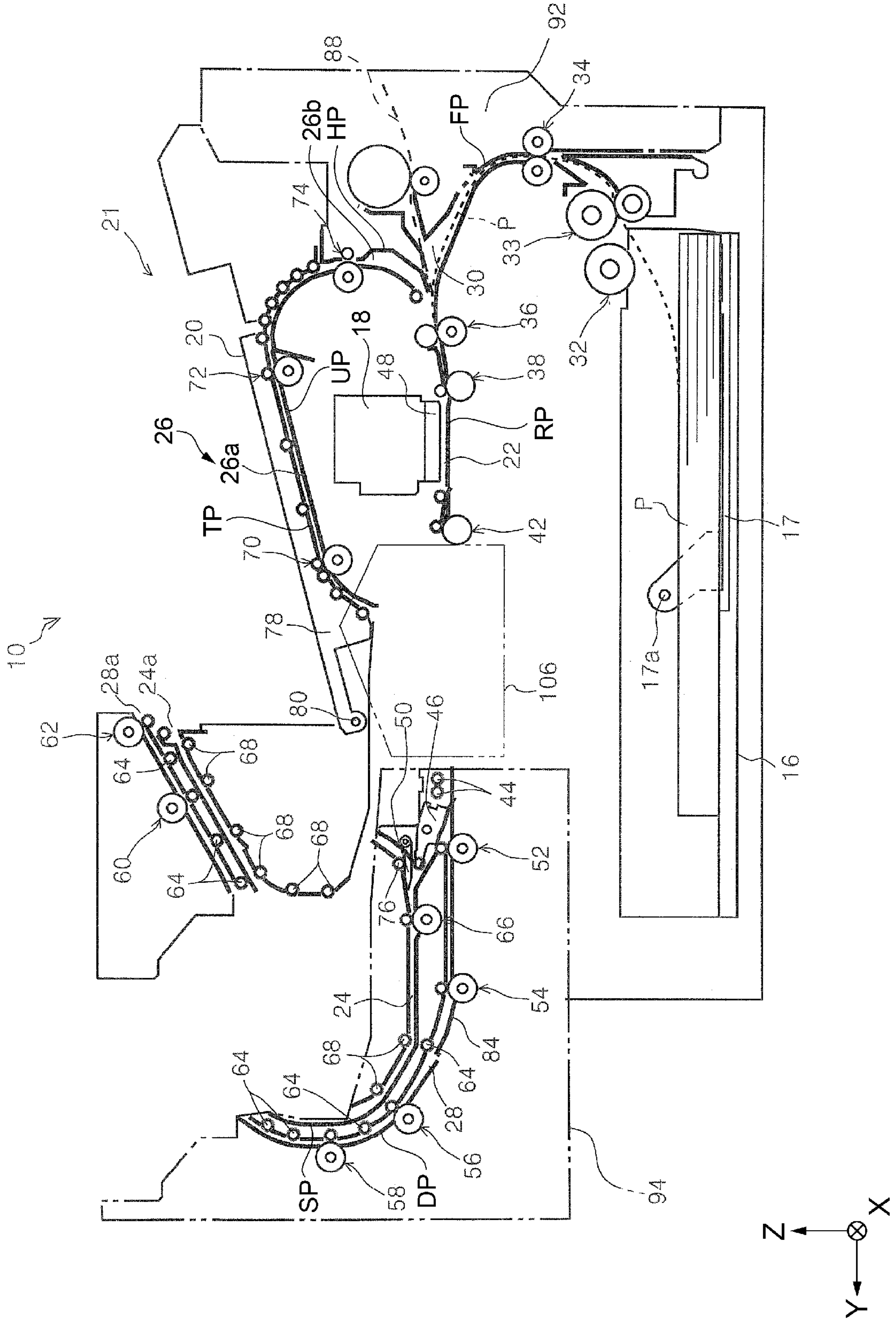
FIG. 12 is a schematic diagram showing the transport path when the slide section is pulled out.

Next, the switchback path 24 and the face down discharge path 28 will be described. In FIG. 12, two dot chain line section denoted by reference numeral 94 indicates a slide section 94 that can take a first state in which the transport path 21 is formed with respect to the device main body 12 and a second state in which the transport path 21 is open. In FIG. 12, among a plurality of star wheels provided in the transport path 21, only the star wheels related to the slide section 94 are denoted by reference numerals, and the reference numerals of the other star wheels are omitted.

The slide section 94 includes a path from the downstream side in the transport direction of the fourth transport roller pair 42 to the first flap 46 and the second flap 50 in the straight path 22, and a path from the second flap 50 to a middle of the curved inversion section via the eleventh transport roller pair 66 in the switchback path 24. Further, the slide section 94 includes a path in the face down discharge path 28 from the first flap 46 through the fifth transport roller pair 52, the sixth transport roller pair 54, the seventh transport roller pair 56, and the eighth transport roller pair 58 to in between a path from the eighth transport roller pair 58 toward the ninth transport roller pair 60.

As shown in FIG. 5, the slide section 94 is configured to be movable in the Y-axis direction with respect to a body structure 96 constituting the transport path 21 in the device main body 12. In the present embodiment, a pair of rail members 98 provided in the body structure 96 are configured to be able to be drawn out and returned into the body structure 96.

Figure 6:
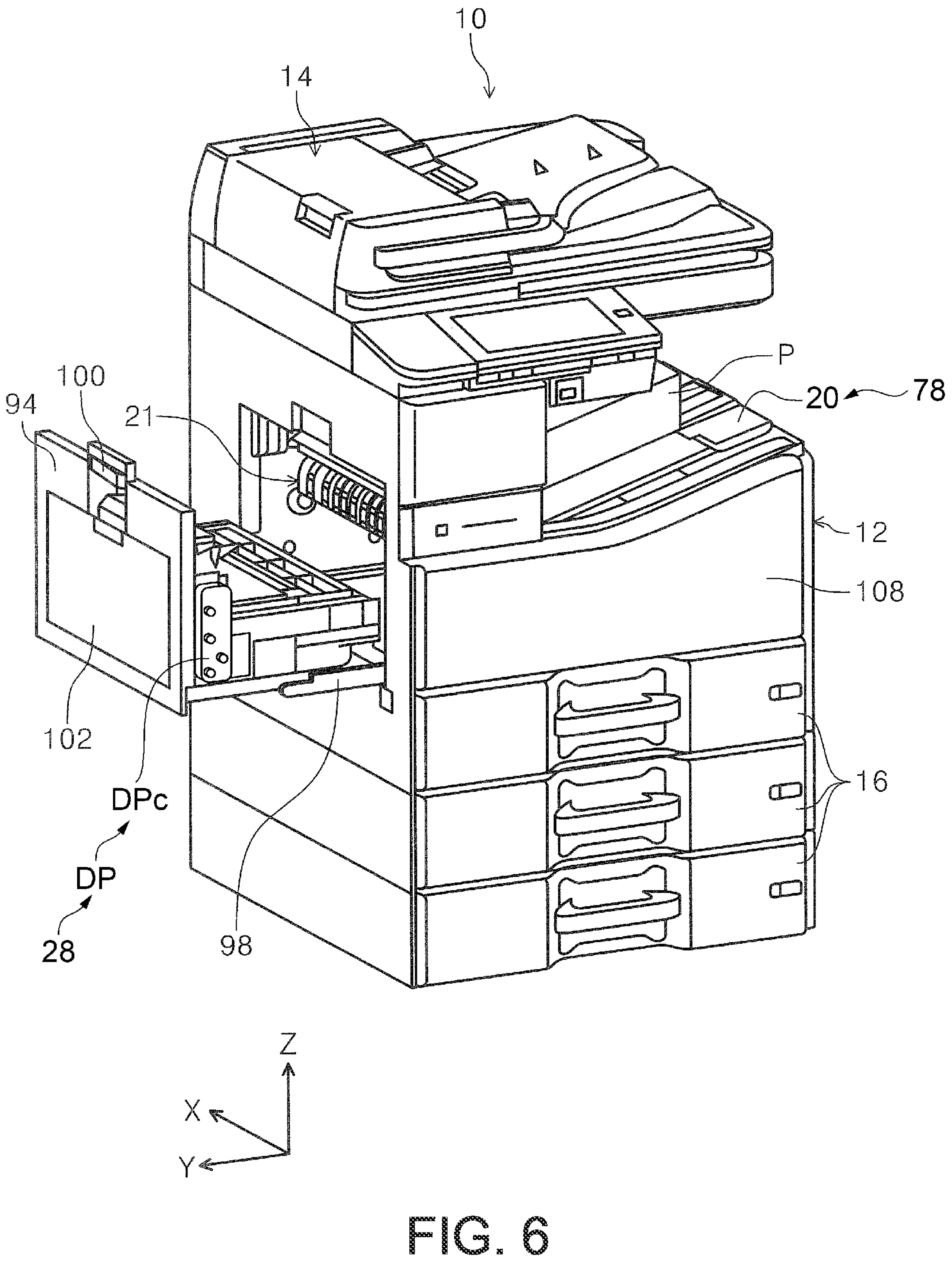
FIG. 6 is a perspective view showing the recording device in a state where the slide section is pulled out.

As shown in FIG. 6, a lever 100 is provided at an end of the slide section 94 on the +Z direction side. The lever 100 is configured to be engageable with a lock mechanism (not shown) provided in the device main body 12. In a state where the slide section 94 is closed with respect to the device main body 12 (see FIG. 7), that is, in a first state where the slide section 94 forms the transport path 21, the lever 100 is in an engaged state with the lock mechanism. Accordingly, the slide section 94 is in a state in which the movement of the slide section 94 with respect to the device main body 12 is restricted.

Then, by lifting the lever 100, for example, the engagement state with the lock mechanism is released, and by pulling the lever 100, the slide section 94 can be pulled out with respect to the device main body 12. In other words, when the lever 100 is pulled in the +Y direction in a state in which the engagement between the lever 100 and the lock mechanism is released, as shown in FIG. 6, a state is obtained in which the slide section 94 is pulled out from the device main body 12, that is, a second state in which the transport path 21 is open.

As shown in FIG. 12, in the second state in which the slide section 94 is pulled out with respect to the device main body 12, a part of the straight path 22, a part of the switchback path 24, and a part of the face down discharge path 28 are exposed toward the outside of the device main body 12. In particular, when a paper jam occurs in the switchback path 24 and the face down discharge path 28, the switchback path 24 and the face down discharge path 28 can be visually confirmed, so that a paper jam recovery process in these paths can be performed more easily. Further, the user can access the path member SP constituting a part of the switchback path 24 and the path member DP constituting a part of the face down discharge path 28.

As shown in FIG. 6, an opening and closing cover 102 is provided on the slide section 94 so as to be pivotable with respect to the slide section 94. When the opening and closing cover 102 is in an opened state (not shown) with respect to the slide section 94, the face up discharge tray 86 provided in the slide section 94 is exposed toward the outside of the device main body 12, and the medium P discharged to the face up discharge tray 86 can be taken out from the device main body 12. Further, the user can access the path member DP constituting a part of the face down discharge path 28.

Next, the straight path 22 and a transport path in the vicinity thereof will be described. As shown in FIG. 5, a frame 104 is vertically provided on the −X direction side of the body structure 96. An opening 106 is formed in the frame 104. As shown in FIG. 9, the opening 106 is formed at a position corresponding to the fourth transport roller pair 42, the fifth transport roller pair 52, the sixth transport roller pair 54, the eleventh transport roller pair 66, the first flap 46, and the second flap 50 when the slide section 94 is in a first state with respect to the body structure 96 in the frame 104, that is, when the slide section 94 constitutes the transport path 21. In FIGS. 9 and 12, a two dot chain line section denoted by reference numeral 106 indicates the opening 106.

As shown in FIGS. 5 and 12, in the second state of the slide section 94 with respect to the body structure 96, that is, in the state where the slide section 94 is pulled out from the body structure 96 to open up the transport path 21, the user can access the recording section 18 and a part of the straight path 22 in the transport path 21, for example, the fourth transport roller pair 42 and the periphery thereof from the side of the transport path 21, that is, from the −X direction side through the opening 106. Also, the inlet of the switchback path 24 and the face down discharge path 28 can be accessed.

Figure 7:
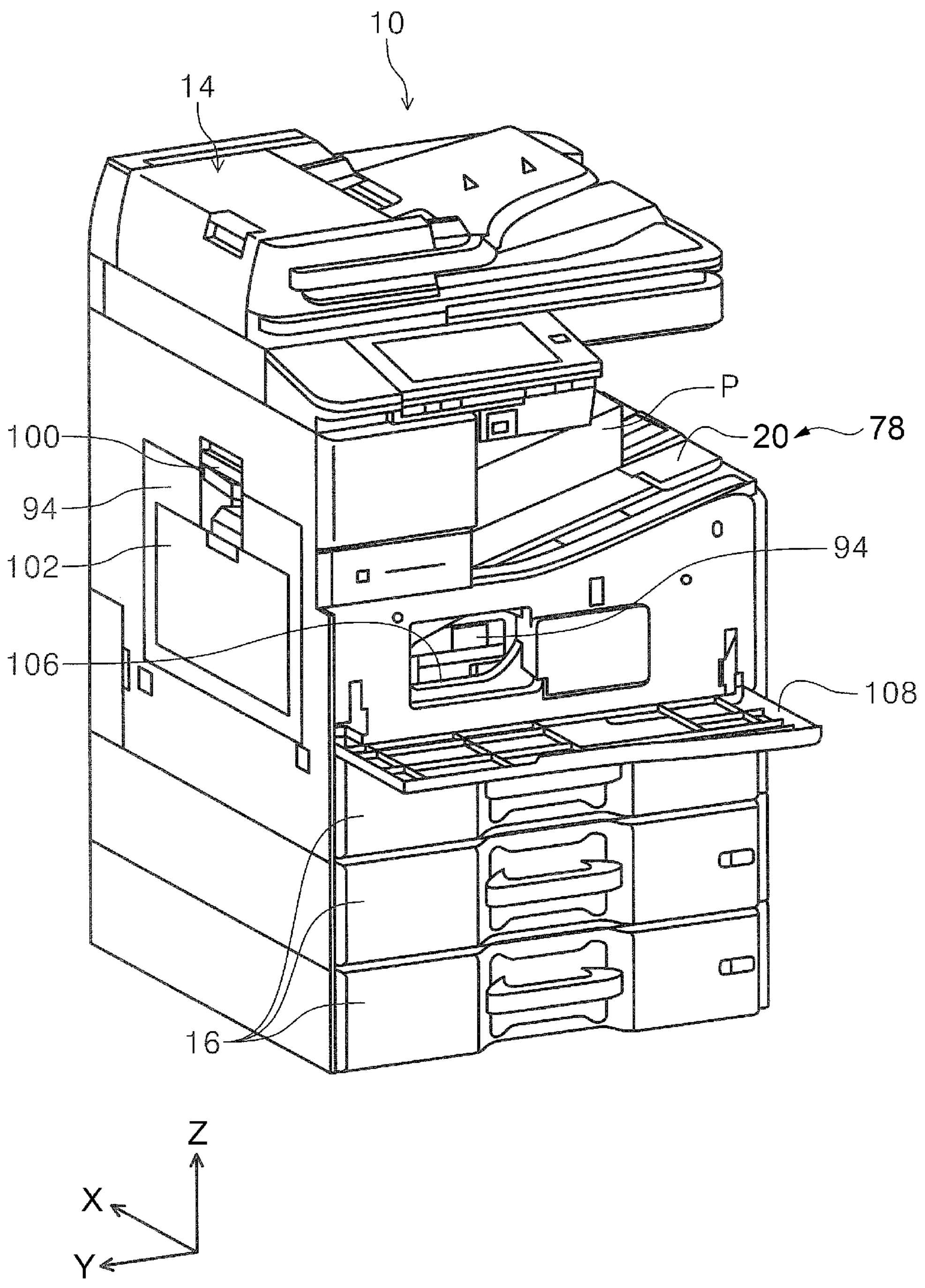
FIG. 7 is a perspective view showing the recording device in a state where a front cover is open.

As shown in FIGS. 5 to 7, a front cover 108 is provided at a position corresponding to the body structure 96 in the Z-axis direction in the device main body 12, that is, on the −X direction side of the frame 104, so as to be pivotable with respect to the device main body 12 with a lower end portion as a pivot fulcrum. By pivoting the front cover 108 with respect to the device main body 12, the opening 106 is exposed toward the outside of the device main body 12.

Figure 8:
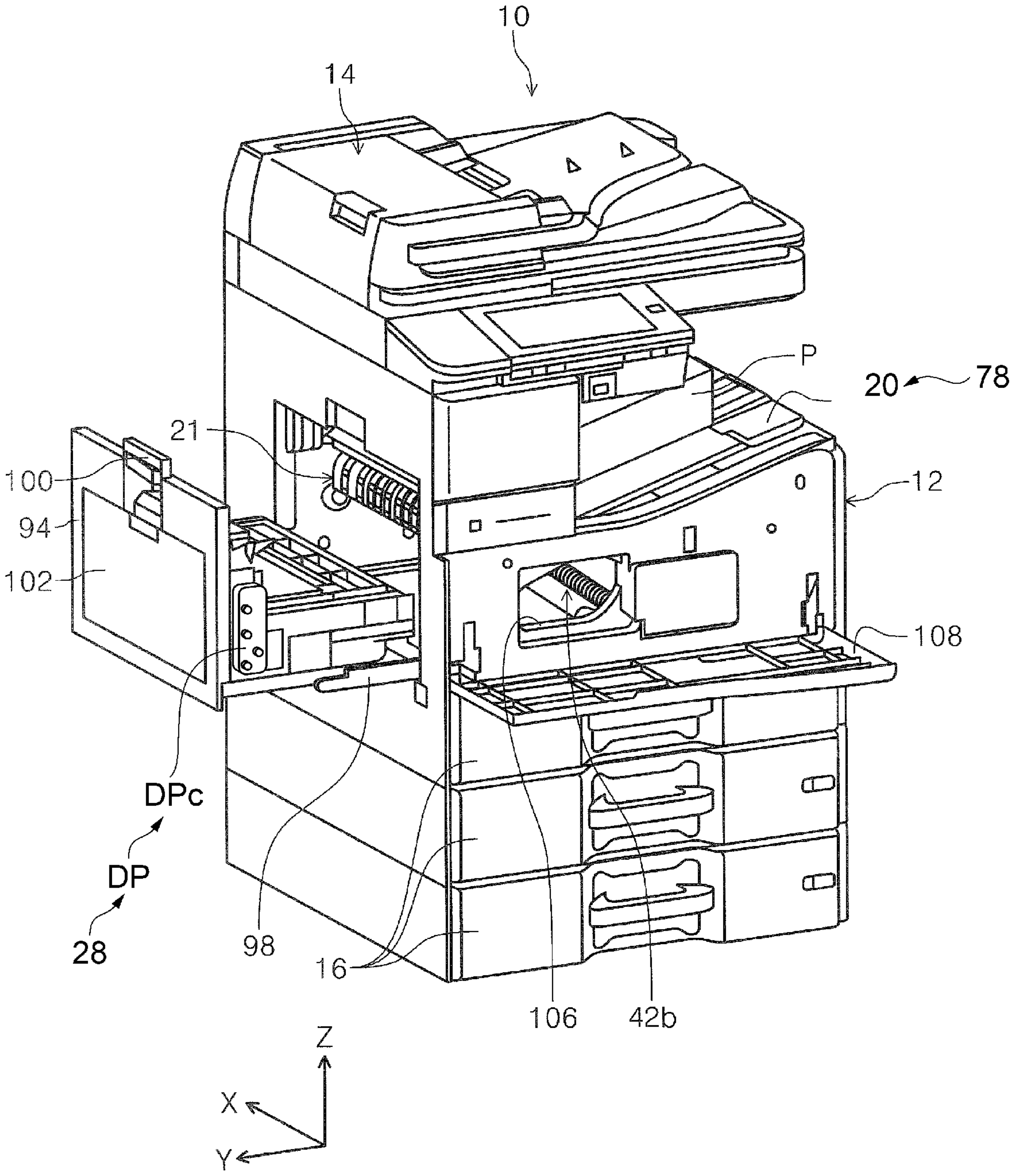
FIG. 8 is a perspective view showing the recording device in a state where the front cover is open and the slide section is pulled out.

Next, as shown in FIG. 8, when the slide section 94 is pulled out from the device main body 12, the part of the slide section 94 that closed off the opening 106 moves in the +Y direction. As a result, the straight path 22 located deep in the device main body 12 inside the opening 106, for example, the fourth transport roller pair 42 located on the downstream side of the recording section 18 and its periphery are visible.

Then, the user can insert his/her hand into the transport path 21 through the opening 106 to perform a paper jam recovery process. Further, the user can access the path member RP constituting the straight path 22 and its vicinity from the +Y direction side of the straight path 22 from the slide section 94 side which is the +Y direction side of the straight path 22.

When the slide section 94 is pulled out from the body structure 96, a roller **42*a* of the fourth transport roller pair 42 separates from a roller 42*b* by an interlocking mechanism (not shown), and the nip state in the fourth transport roller pair 42 is eliminated. Thus, the paper jam generated in the recording section 18** can be easily processed.

In the medium P transported on the transport path 21, an edge of the medium P in the X-axis direction tends to rub against the path members FP, RP, DP, SP, TP, UP, HP, and the central portion in the X-axis direction does not tend to rub against the path members FP, RP, DP, TP, SP, UP, HP. For this reason, in the path members FP, RP, DP, SP, TP, UP, HP, the degree of wear, contamination, adhesion of paper powder, and the like of the path members FP, RP, DP, TP, SP, UP, HP may differ between a portion through which the edge of the medium P of a frequently used size passes and a portion other than that portion. Therefore, in this embodiment, a plurality (six in this embodiment) of path members FP, RP, DP, SP, TP, UP, HP are provided in the X-axis direction so that a portion where wear, contamination, adhesion of paper powder, and the like has progressed can be switched.

For this reason, based on the recording information RI, the control section 15 calculates a deterioration degree D of the performance of guiding the medium P for each of the path members XP included in the transport path TR in the X axis direction. The recording information RI related to the recording specification includes a size of the medium P, a direction of the medium P with respect to the transport direction, a type of the medium P, a recording speed, which is a time required for recording on the medium P, the recording density, which is an amount of color material adhering to the medium P during recording on the medium P, environmental information related to the use environment when recording is performed, information of the medium P in which transport failure occurred in the transport path TR, and the like. From the size of the medium P and the direction of the medium P with respect to the transport direction in the recording information RI, the control section 15 specifies the path member XP through which the edge of the medium P in the X-axis direction passes, and adds a set addition value, in a number of the number of sheets medium P that passed through the path member XP, to the deterioration degree D of the specified path member XP.

For example, in a case where the medium P having high stiffness passes through the path member XP, the control section 15 increases the addition value to the deterioration degree D of the path member XP compared to a case where the medium P having low stiffness passes through the path member XP. For example, in a case where the recording speed in recording on the medium P is high, the control section 15 increases the addition value to the deterioration degree D of the path member XP compared to a case where the recording speed is low. For example, in a case where the recording density in recording on the medium P is high, the control section 15 increases the addition value to the deterioration degree D of the path member XP compared to a case where the recording density is low.

For example, in a case where the humidity when recording is performed is low, the control section 15 increases the addition value to the deterioration degree D of the path member XP compared to a case where the humidity is high. For example, there is a high probability that the deterioration degree D of the path member XP through which the X-axis direction edge of the medium P in which a transport failure has occurred in the transport path TR passes is close to a set value SV, which is set as a reference for switching position of the path member XP. In a case where the deterioration degree D is calculated in consideration of a plurality of pieces of recording information RI, from among the pieces of recording information RI other than the size of the medium P and the direction of the medium P with respect to the transport direction, each piece of recording information RI may be weighted in consideration of the degree of influence on the deterioration degree D.

When the path members XP include a set-value-exceeded path member EX, in which the deterioration degree D exceeds the set value SV, and a set-value-not-exceeded path member NEX, in which the deterioration degree D does not exceed the set value SV, the notification SC is performed which causes the display panel 19 to display a message prompting switching the set-value-exceeded path member EX and the set-value-not-exceeded path member NEX.

Here, configurations of the path member FP, the path member HP, the path member DP, and the path member UP will be described. Note that in the present embodiment, description of the path members RP, SP, TP, which have a configuration similar to that of the path member UP, will be omitted.

First, the path member FP constituting a part of the feed path 30 and attachment and detachment of the path member FP with respect to the opening and closing section 92 will be described. Although the path member FP is attached to and detached from the opening and closing section 92 in a state shown in FIG. 3 in which the opening and closing section 92 is open with respect to the device main body 12, directions of spatial axes X, Y, and Z in a state in which the opening and closing section 92 is closed with respect to the device main body 12 are used for description in FIGS. 13, 14, and 16.

Figure 13:
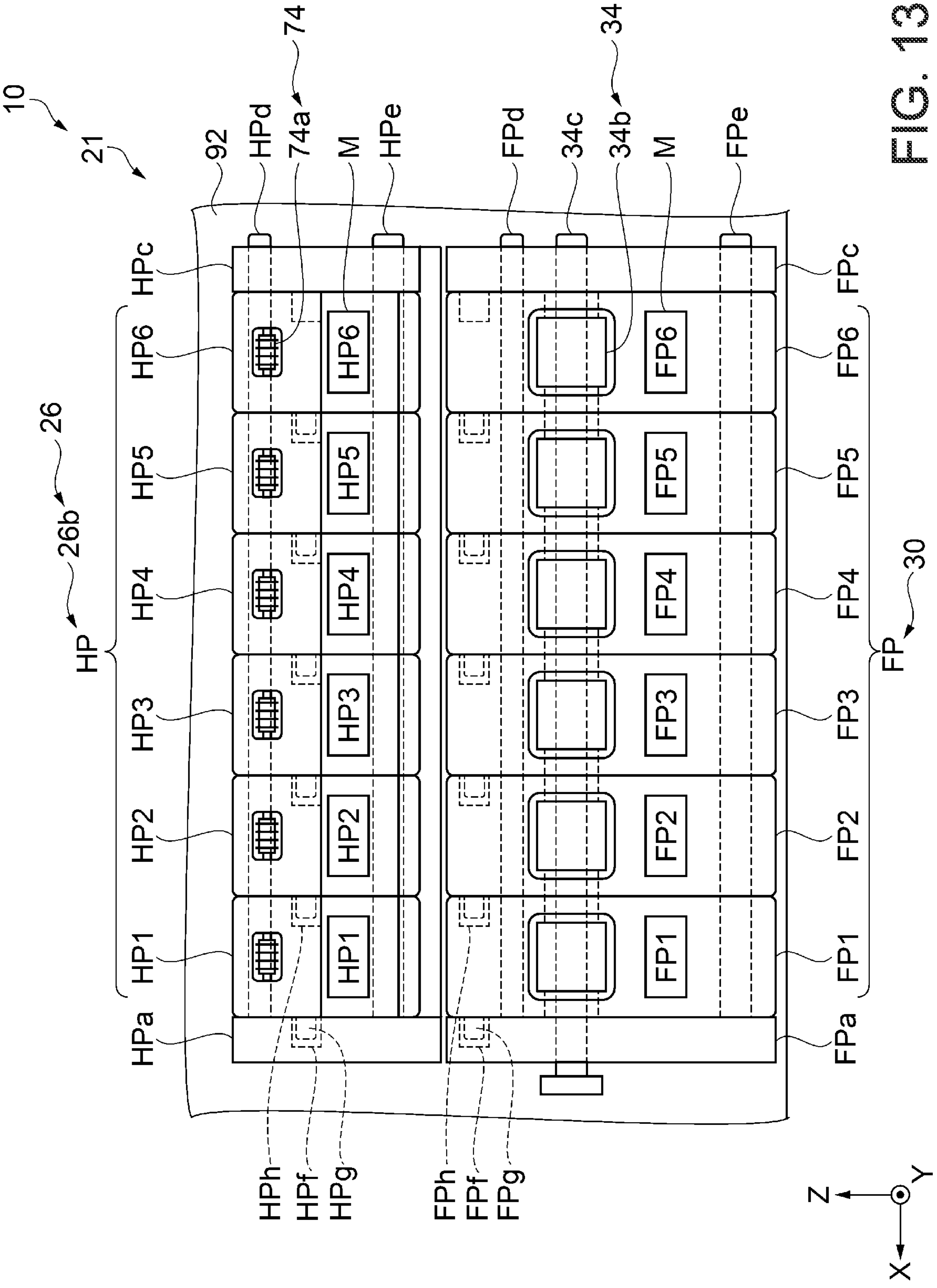
FIG. 13 is a schematic diagram showing configuration of an inversion section of a inversion path and a feed path.
Figure 14:
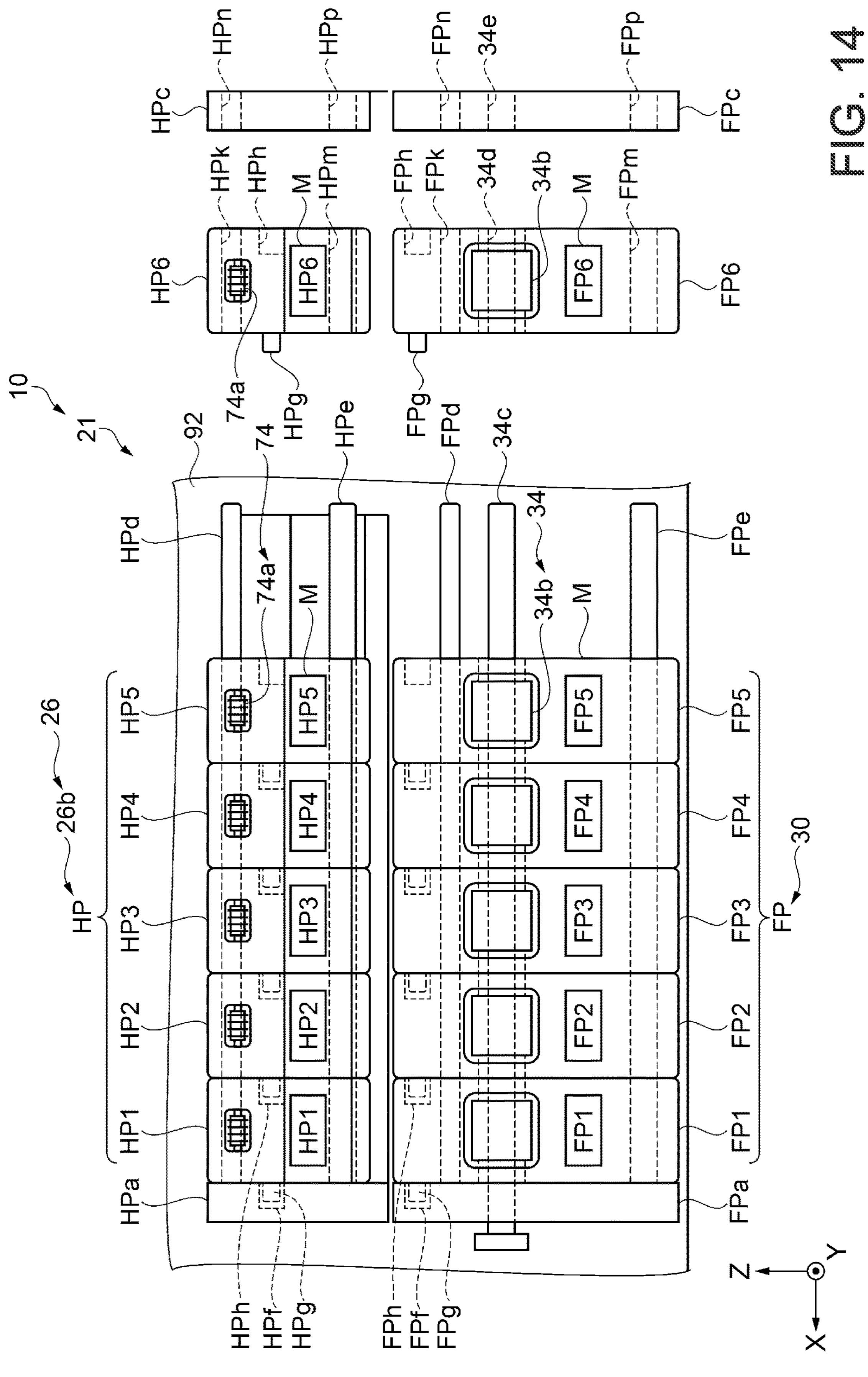
FIG. 14 is a schematic diagram showing configuration of the inversion section of the inversion path and the feed path.

As shown in FIGS. 13 and 14, the feed path 30 includes an adjacent section FPa, path members FP1, FP2, FP3, FP4, FP5, FP6, which are a plurality of path members FP, and a restriction section FPc. The adjacent section FPa, the path members FP1, FP2, FP3, FP4, FP5, FP6, and the restriction section FPc are provided with respect to the opening and closing section 92 so as to be aligned in the X-axis direction, which is the path width direction of the feed path 30.

The adjacent section FPa is provided at an end on the +X direction side of the opening and closing section 92 in the X-axis direction. The adjacent section FPa is provided with an assembled section FPf, an attachment section FPd, and an attachment section FPe. The assembled section FPf is a recess that is provided on a surface of the adjacent section FPa on the −X direction side and opens in the −X direction. The attachment section FPd is a shaft having a circular cross section and extending in the −X direction from the adjacent section FPa. The attachment section FPe is a shaft that has a circular cross section and that extends in the −X direction from the adjacent section FPa, and is provided at a position on the −Z direction side with respect to the attachment section FPd at an interval from the attachment section FPd. The cross-sectional diameter of the attachment section FPe is set to be larger than that of the attachment section FPd. Further, the adjacent section FPa supports a drive shaft 34*c* extending in the X-axis direction so as to be rotatable about an axis along the X-axis direction. The drive shaft 34*c* is located between the attachment section FPd and the attachment section FPe in the Z-axis direction.

The path members FP1, FP2, FP3, FP4, FP5, FP6 of the embodiment have the same shape. The path members FP1, FP2, FP3, FP4, FP5, FP6 are provided with an assembling section FPg, an assembled section FPh, a guide section FPk, a guide section FPm, and a mark M. The assembling section FPg is a protrusion that is provided on a surface on the +X direction side of the path members FP1, FP2, FP3, FP4, FP5, FP6 and protrudes in the +X direction. The guide section FPk is a through hole extending in the X-axis direction, and is set to a size into which the attachment section FPd can be inserted. The guide section FPm is a through hole extending in the X-axis direction, and is set to a size into which the attachment section FPe can be inserted. The mark M is provided on the surface on the +Y direction side of the path members FP1, FP2, FP3, FP4, FP5, FP6 to enable identification of each of the path members FP1, FP2, FP3, FP4, FP5, FP6.

Each of the path members FP1, FP2, FP3, FP4, FP5, FP6 supports a roller 34*b* as a driving roller so as to be rotatable about an axis along the X-axis direction. Each roller 34*b* is provided with a through hole 34*d* extending in the X-axis direction. By inserting the drive shaft 34*c* into the through hole 34*d*, the six rollers 34*b* supported by the path members FP1, FP2, FP3, FP4, FP5, FP6 rotate in synchronization with the rotation of the drive shaft 34*c*.

The restriction section FPc is detachably provided at an end on the −X direction side of the opening and closing section 92 which is a position adjacent to the path members FP1, FP2, FP3, FP4, FP5, FP6 on the −X direction side in the X-axis direction. The restriction section FPc is provided with a holding section FPn, a support section 34*e*, and a holding section FPp. The holding section FPn is a through hole extending in the X-axis direction, and is set to a size into which the attachment section FPd can be inserted. The holding section FPp is a through hole extending in the X-axis direction, and is set to a size into which the attachment section FPe can be inserted. The support section 34_e_ is a through hole extending in the X-axis direction and rotatably supports the drive shaft 34_c_.

For example, it will be assumed that in the state shown in FIG. 13, a large number of media P, which have a size such that the X-axis direction edge passes over the path member FP3 and the path member FP4, are transported, and the deterioration degree D of the path members FP3 and FP4 calculated by the control section 15 exceeds the set value SV. In this case, the path members FP3, FP4 are set-value-exceeded path members EX. At this time, in the case that the path members FP1, FP2, FP5, FP6 include set-value-not-exceeded path members NEX, in which the calculated deterioration degree D does not exceed the set value SV, then the control section 15 performs a notification SC to display on the display panel 19 a message to prompt switching of set-value-exceeded path members EX and set-value-not-exceeded path members NEX.

Figure 15:
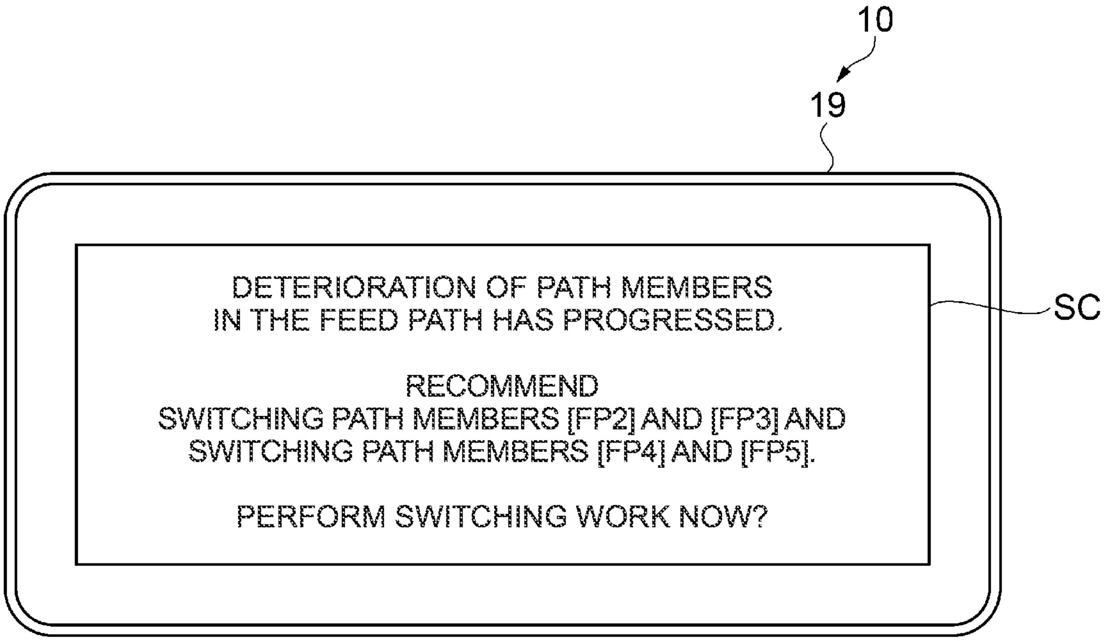
FIG. 15 is a schematic diagram showing a notification section for displaying a notification to prompt switching of the path members.

In a case where the deterioration degree D of the path members FP2, FP5 is the smallest, then as shown in FIG. 15, the control section 15 performs a notification SC to display on the display panel 19 a message to prompt switching positions of the path member FP2 and the path member FP3 and switching positions of the path member FP4 and the path member FP5. At this time, using the marks M, the notification SC is performed for causing the display panel 19 to display a message prompting switching of the positions of the path member FP2 and the path member FP3 and switching positions of the path member FP4 and the path member FP5.

When the user removes the path members FP1, FP2, FP3, FP4, FP5, FP6 from the opening and closing section 92, first, the fixing of the restriction section FPc to the opening and closing section 92 is released, and the holding sections FPn, FPp of the restriction section FPc are slid in the −X direction with respect to the attachment sections FPd, FPe, thereby removing the restriction section FPc from the fixed position of the opening and closing section 92. Then, by sliding the guide sections FPk, FPm of the path members FP1, FP2, FP3, FP4, FP5, FP6 in the −X direction with respect to the attachment sections FPd, FPe, it is possible to remove the path members FP1, FP2, FP3, FP4, FP5, FP6 from the opening and closing section 92. In other words, the path members FP1, FP2, FP3, FP4, FP5, FP6 are detachably provided to the attachment sections FPd, FPe, and are slidably provided in the X-axis direction with respect to the attachment sections FPd, FPe.

In FIG. 13, a position at which the path member FP1 is arranged adjacent to the adjacent section FPa in the X-axis direction will be assumed to be a predetermined position. Of the path members FP1, FP2, FP3, FP4, FP5, FP6 removed from the attachment sections FPd, FPe, when the path member FP1 is arranged at the predetermined position, the attachment sections FPd, FPe are inserted into the guide sections FPk, FPm of the path member FP1. Then, the path member FP1 is slid along the attachment sections FPd, FPe in the +X direction. Then, the assembling section FPg of the path member FP1 is assembled to the assembled section FPf of the adjacent section FPa, and the path member FP1 is brought into contact with the adjacent section FPa, whereby the path member FP1 is arranged at the predetermined position. As long as the adjacent section FPa is adjacent to the predetermined position in the X-axis direction, it may not be in contact with the predetermined position.

Next, in FIG. 13, a position adjacent to the path member FP1 arranged at the above-described predetermined position in the X-axis direction and at which the path member FP2 is arranged is assumed to be an adjacent position. Then, when the path member FP3 removed from the attachment sections FPd, FPe is arranged at the adjacent position, the attachment sections FPd, FPe are inserted into the guide sections FPk, FPm of the path member FP3. Then, the path member FP3 is slid along the attachment sections FPd, FPe in the +X direction. Then, the assembling section FPg of the path member FP3 is assembled to the assembled section FPh of the path member FP1, and the path member FP3 is brought into contact with the path member FP1, whereby the path member FP3 is arranged at the adjacent position. The path member FP1 is an example of a first path member, and the path member FP3 is an example of a second path member. As long as the adjacent position is adjacent to the path member FP1 arranged at the predetermined position in the X-axis direction, there need not be contact with the path member FP1.

Figure 16:
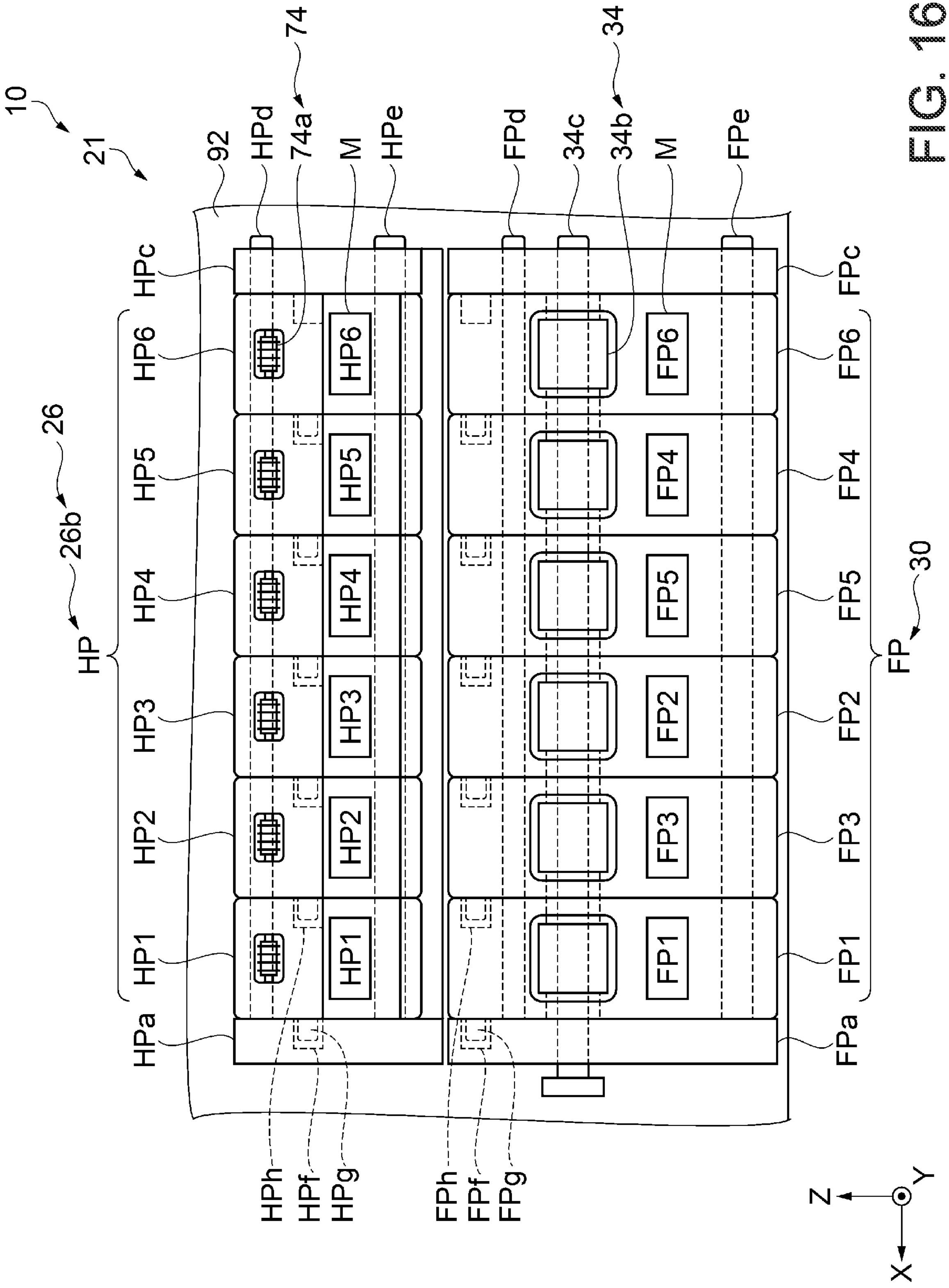
FIG. 16 is a schematic diagram showing configuration of the inversion section of the inversion path and the feed path.

Then, the path members FP2, FP4, FP5, FP6 removed from the attachment sections FPd, FPe are arranged as shown in FIG. 16, the attachment sections FPd, FPe are inserted into the guide sections FPk, FPm of the path members FP2, FP5, FP4, FP6 in the order of the path member FP2, the path member FP5, the path member FP4, the path member FP6 in the same procedure as when the path member FP3 is arranged at the adjacent position.

Then, the attachment sections FPd, FPe and the drive shaft 34_c_ are inserted into the holding sections FPn, FPp and the support section 34_e_ of the restriction section FPc, and the restriction section FPc is fixed to the fixed position of the opening and closing section 92. Accordingly, the path members FP are arranged in the X-axis direction as shown in FIG. 16, in which the positions of the path member FP2 and the path member FP3 are switched, and the positions of the path member FP4 and the path member FP5 are switched. That is, the path members FP1, FP2, FP3, FP4, FP5, FP6 provided in the feed path 30 constituting the transport path 21 can mutually switch positions with each other. In other words, the path members FP are provided in the transport path 21 so they can switch positions with each other.

Next, the path member HP constituting the inversion section 26_b_ of the inversion path 26 will be described. Since a method of attaching and detaching the path member HP to and from the opening and closing section 92 is similar to that of the path member FP, description thereof will be omitted.

As shown in FIGS. 13 and 14, the inversion section 26_b_ of the inversion path 26 includes an adjacent section HPa, path members HP1, HP2, HP3, HP4, HP5, HP6, which are a plurality of path members HP, and a restriction section HPc. The adjacent section HPa, the path members HP1, HP2, HP3, HP4, HP5, HP6, and the restriction section HPc are provided so as to be aligned in the X-axis direction, which is the path width direction of the inversion path 26 with respect to the opening and closing section 92.

Similarly to the adjacent section FPa, the adjacent section HPa is provided at an end on the +X direction side of the opening and closing section 92 in the X-axis direction. The adjacent section HPa is provided with an assembled section HPf, an attachment section HPd, and an attachment section HPe similar to configuration of the adjacent section FPa. Since the path member HP does not include a driving roller and a drive shaft, the adjacent section HPa does not include configuration such as the adjacent section FPa that rotatably supports a drive shaft.

The path members HP1, HP2, HP3, HP4, HP5, HP6 of the embodiment have the same shape. The path members HP1, HP2, HP3, HP4, HP5, HP6 are provided with an assembling section HPg, an assembled section HPh, a guide section HPk, a guide section HPm, and a mark M similar to configuration of the path member FP. The mark M is provided on the surface on the +Y direction side of the path members HP1, HP2, HP3, HP4, HP5, HP6 so as to be able to identify each of the path members HP1, HP2, HP3, HP4, HP5, HP6. Each of the path members HP1, HP2, HP3, HP4, HP5, HP6 supports a roller 74*a* as a driven roller so as to be rotatable about an axis along the X-axis direction.

Similar to the restriction section FPc, the restriction section HPc is detachably provided at an end on the −X direction side of the opening and closing section 92, which is at a position adjacent to the path members HP1, HP2, HP3, HP4, HP5, HP6 on the −X direction side in the X-axis direction. The restriction section HPc is provided with a holding section HPn and a holding section HPp, similar to configuration of the restriction section FPc. Since the path member HP does not include a driving roller and a drive shaft, the restriction section HPc does not include configuration such as the restriction section FPc that rotatably supports a drive shaft.

With the same configuration as the path member FP included in the path member HP as described above, the path members HP1, HP2, HP3, HP4, HP5, HP6 are provided to be attachable to and detachable from the attachment sections HPd, HPe, and are provided to be slidable in the X-axis direction with respect to the attachment sections HPd, HPe, similarly to the path member FP. The path members HP1, HP2, HP3, HP4, HP5, HP6 are provided in the inversion section 26*b* of the inversion path 26 constituting the transport path 21 so as to be capable of mutually switching positions with each other. In other words, the path members HP are provided in the transport path 21 so as to be capable of mutually switching positions with each other.

Next, the path member DP constituting the face down discharge path 28 will be described. As shown in FIGS. 6 and 12, the path member DP is attached to and detached from the slide section 94 in the second state in which the slide section 94 is pulled out. In addition, when the opening and closing cover 102 is open with respect to the slide section 94, it is possible to attach and detach the path member DP while visually recognizing the mark M of the path member DP which will be described later. Since a method of attaching and detaching the path member DP to and from the slide section 94 is similar to that of the path member FP, description thereof will be omitted.

The face down discharge path 28 includes an adjacent section DPa (not shown), path members DP1, DP2, DP3, DP4, DP5, DP6 (not shown) which are a plurality of path members DP, and a restriction section DPc shown in FIG. 6. The adjacent section DPa, the path members DP1, DP2, DP3, DP4, DP5, DP6, and the restriction section DPc are provided so as to be aligned in the X-axis direction, which is the path width direction of the face down discharge path 28 with respect to the slide section 94.

Similarly to the adjacent section FPa, the adjacent section DPa is provided at an end on the +X direction side of the opening and closing section 92 in the X-axis direction. The adjacent section DPa is provided with an assembled section DPf (not shown), an attachment section DPd (not shown), and an attachment section Dpe (not shown) similar to configuration of the adjacent section FPa. Similarly to the adjacent section FPa, the adjacent section DPa supports a drive shaft 56*c*, 58*c* (not shown) extending in the X-axis direction so as to be rotatable about an axis along the X-axis direction.

The path members DP1, DP2, DP3, DP4, DP5, DP6 of the embodiment have the same shape. The path members DP1, DP2, DP3, DP4, DP5, DP6 are provided with an assembling section DPg (not shown), an assembled section DPh (not shown), a guide section DPk (not shown), a guide section DPm (not shown), and a mark M (not shown) similar to configuration of the path member FP. The mark M is provided on the surface on the +Y direction side of the path members DP1, DP2, DP3, DP4, DP5, DP6 so as to be able to identify each of the path members DP1, DP2, DP3, DP4, DP5, DP6. Similarly to the path member FP, each of the path members DP1, DP2, DP3, DP4, DP5, DP6 supports a roller 56*b*,58*b* so as to be rotatable about an axis along the X-axis direction.

Similar to the restriction section FPc, the restriction section DPc is detachably provided at an end on the −X direction side of the slide section 94 which is a position adjacent to the path members DP1, DP2, DP3, DP4, DP5, DP6 on the −X direction side in the X-axis direction. The restriction section DPc is provided with a holding section DPn (not shown), a support sections 56*e*,58*e* (not shown), and holding section DPp (not shown) similar to configuration of the restriction section FPc. The support section 56*e*, 58*e* rotatably supports the drive shaft 56*c*, 58*c*.

With the same configuration as the path member FP included in the path member DP as described above, the path members DP1, DP2, DP3, DP4, DP5, DP6 are provided to be attachable to and detachable from the attachment sections DPd, DPe, and are provided to be slidable in the X-axis direction with respect to the attachment sections DPd, DPe, similarly to the path member FP. The path members DP1, DP2, DP3, DP4, DP5, DP6 are provided in the face down discharge path 28 constituting the transport path 21 so that their positions can be mutually switched with each other. In other words, the path members DP are provided in the transport path 21 so that their positions can be mutually switched with each other.

Next, the path member UP constituting the upper area 26*a* of the inversion path 26 will be described. As shown in FIG. 4, the path member UP is attached to and detached from the inversion path 26 in a state where the upper member 78 is open with respect to the device main body 12.

Figure 17:
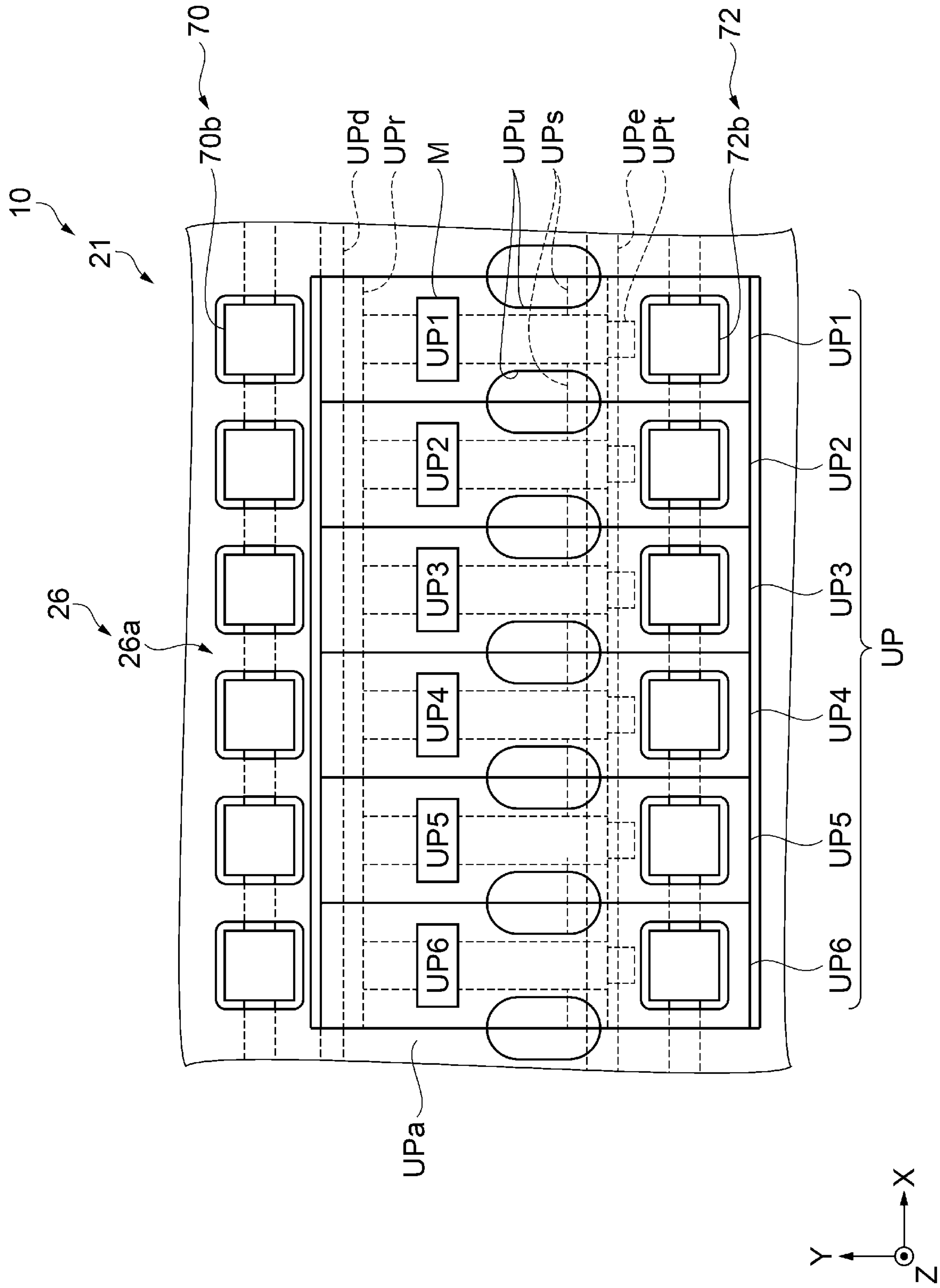
FIG. 17 is a schematic diagram showing configuration of an upper area of the inversion path.
Figure 18:
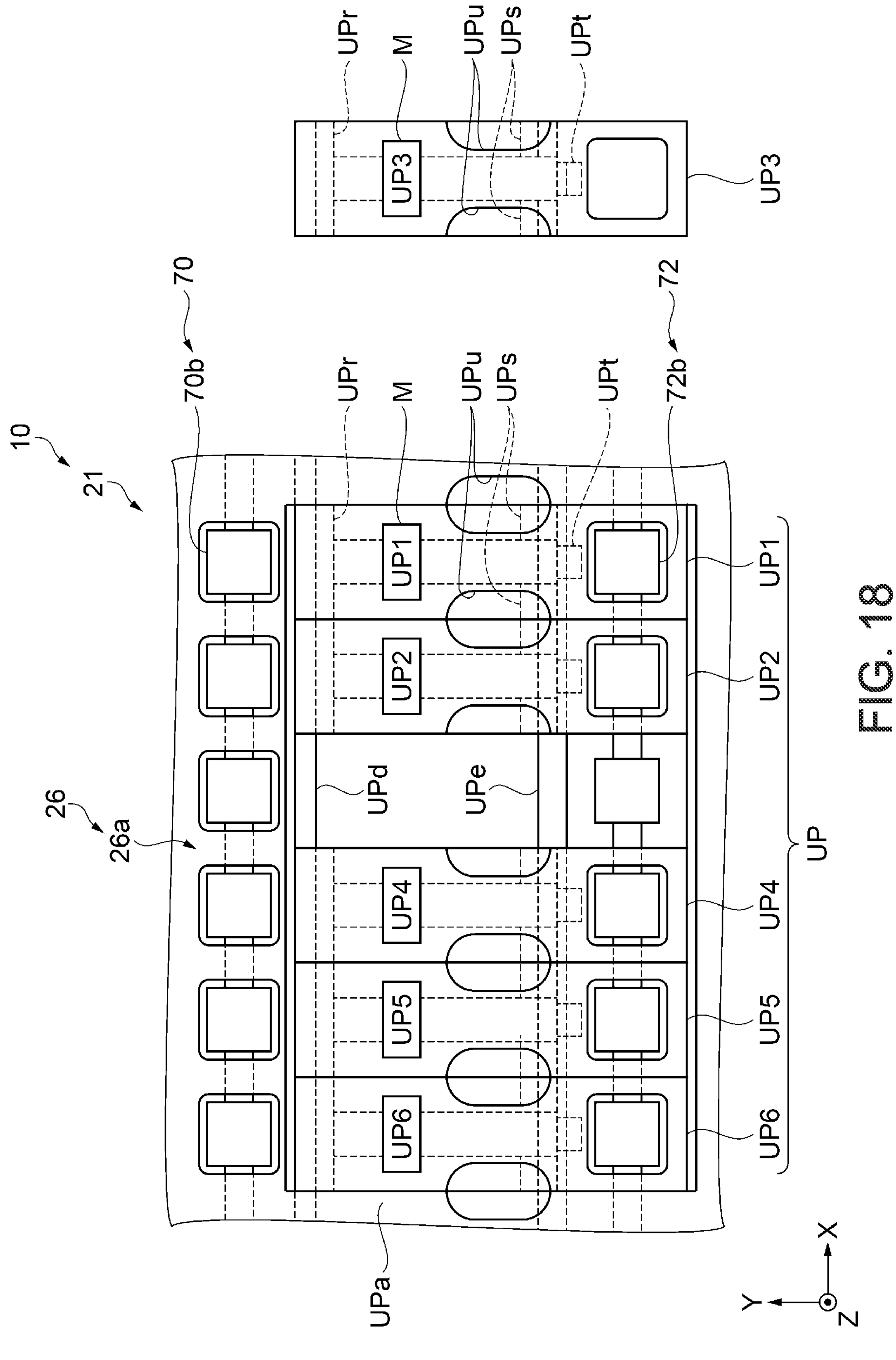
FIG. 18 is a schematic diagram showing configuration of the upper area of the inversion path.

As shown in FIGS. 17 and 18, the upper area 26*a* of the inversion path 26 includes a roller 70*b*, a roller 72*b*, an adjacent section UPa, and a plurality of path members UP, that is, path members UP1, UP2, UP3, UP4, UP5, UP6. The path members UP1, UP2, UP3, UP4, UP5, UP6 are provided so as to be aligned in the X-axis direction, which is a path width direction of the inversion path 26, with respect to the adjacent section UPa that is a base member of the upper area 26*a*.

The adjacent section UPa is provided with an attachment section UPd and an attachment section UPe. As shown in FIGS. 17 to 20, the attachment section UPd is a shaft having a circular cross section extending in the X-axis direction. The attachment section UPe is a shaft having a circular cross section and extending in the X direction, and is provided at a position on the −Y direction side with respect to the attachment section UPd at an interval from the attachment section UPd. The cross-sectional diameter of the attachment section UPe is set to be larger than that of the attachment section UPd.

The path members UP1, UP2, UP3, UP4, UP5, UP6 of the embodiment have the same shape. The path members UP1, UP2, UP3, UP4, UP5, UP6 are provided with a positioning section UPr, a positioning section UPs, a fixed hook UPt, a handle section UPu, and a mark M.

The positioning section UPr is a recess that is provided on the −Z direction side with respect to a +Z direction side surface for guiding the medium P in the path member UP, and that extends over the X-axis direction of the path member UP. The positioning section UPr is located on the +Y direction side with respect to a center of the path member UP in the Y-axis direction, and is open toward the +Y direction. By fitting the positioning section UPr into the attachment section UPd, movement of the path member UP relative to the attachment section UPd in the Z-axis direction and the +Y direction is restricted.

The positioning section UPs is a step-like protrusion spanning across the X-axis direction of the path member UP and is provided on the −Z direction side of the path member UP with respect to the +Z direction side surface that guides the medium P. The positioning section UPs is located on the −Y direction side with respect to the Y-axis direction center of the path member UP, and protrudes in the −Z direction. When the positioning section UPs comes into contact with the attachment section UPe, movement of the path member UP relative to the attachment section UPe in the −Z direction and the −Y direction is restricted.

The fixed hook UPt is a hook-shaped protrusion that is provided on the −Z direction side with respect to the +Z direction side surface for guiding the medium P in the path member UP and that protrudes in the −Z direction. The fixed hook UPt is a so-called snap-fit provided so as to be hooked on the attachment section UPe. When the fixed hook UPt is hooked on the attachment section UPe, movement of the path member UP with respect to the attachment section UPe in the +Z direction is restricted.

The handle section UPu is a pair of recesses provided on both side surfaces of the path member UP in the X-axis direction. The user can remove the path member UP from the attachment sections UPd, UPe or attach the path member UP to the attachment sections UPd, UPe by pinching the handle section UPu.

The mark M is provided on the surface on the +Z direction side of the path members UP1, UP2, UP3, UP4, UP5, UP6 so as to be able to identify each of the path members UP1, UP2, UP3, UP4, UP5, UP6.

Figure 19:
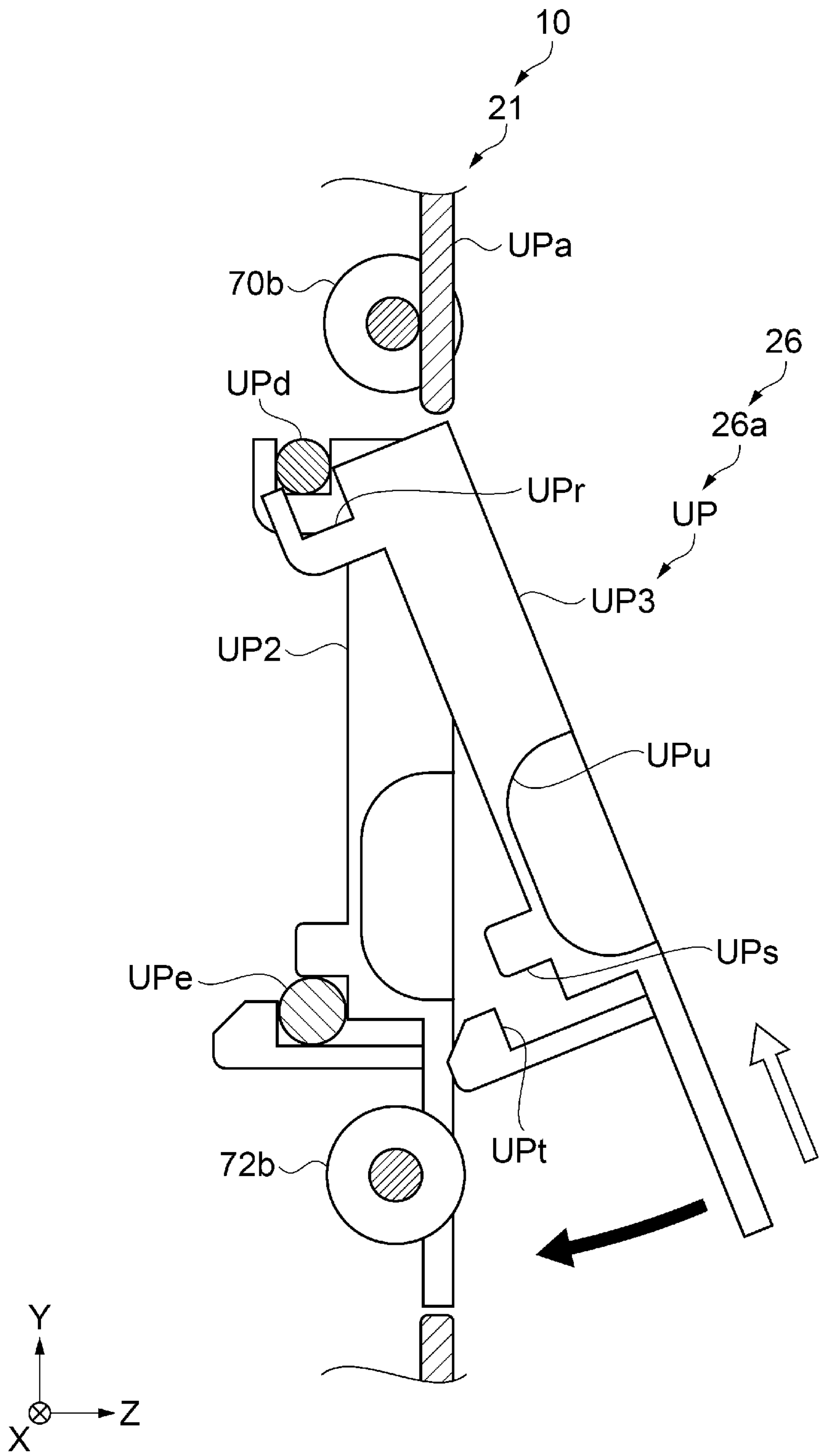
FIG. 19 is a schematic diagram showing how the path member is attached.

For example, when attaching the path member UP3 at a position between the path member UP2 and the path member UP4 shown in FIG. 18 in the X-axis direction, the handle section UPu of the path member UP3 is pinched, and as shown in FIG. 19, the path member UP3 is moved in the direction shown by an outlined arrow from a position on the +Z direction side and −Y direction side with respect to the attachment section UPd, so that the positioning section UPr of the path member UP3 is fitted into the attachment section UPd. A direction indicated by the outlined arrow is a direction intersecting the X-axis direction.

Figure 20:
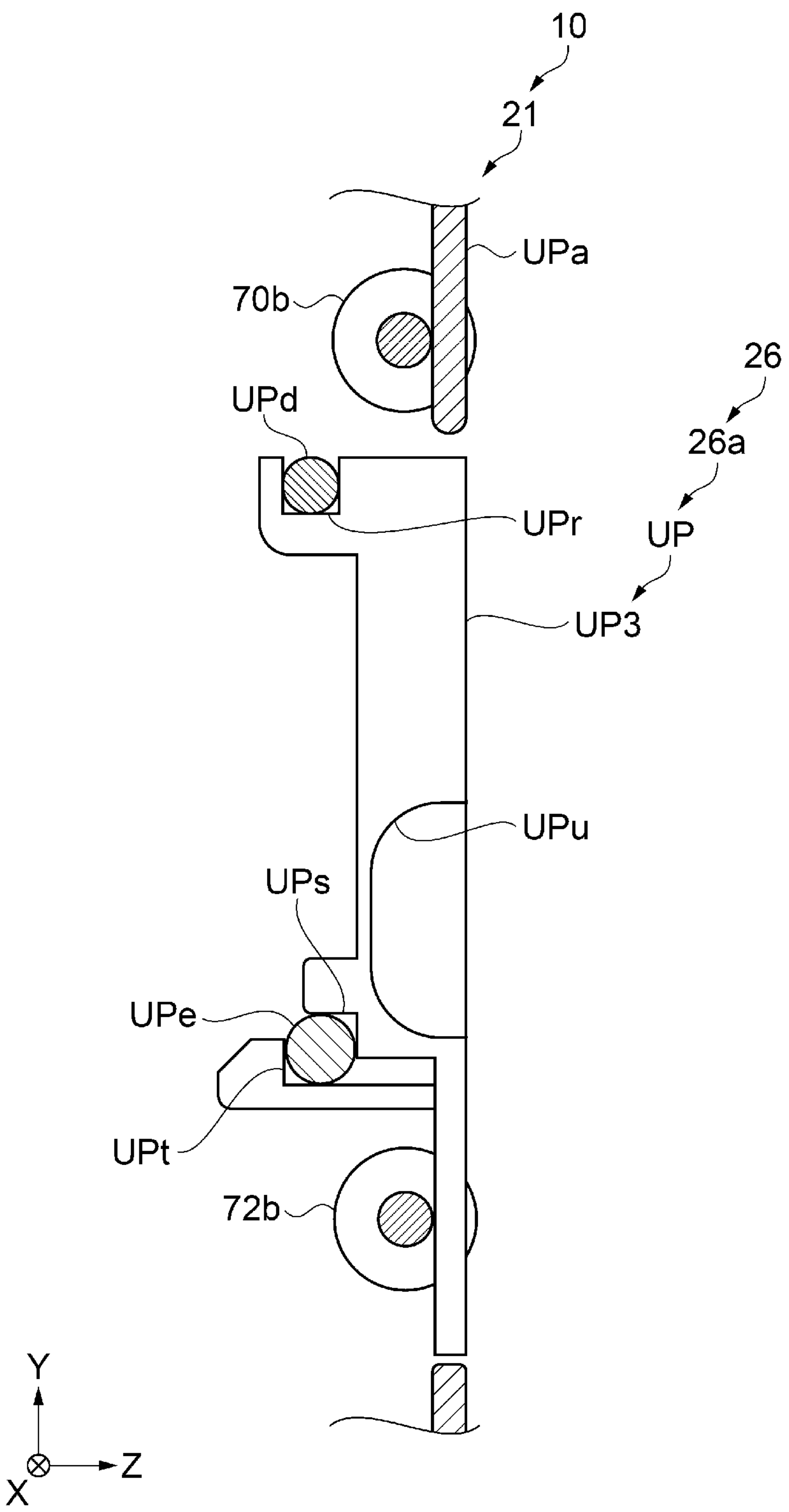
FIG. 20 is a schematic diagram showing how the path member is attached.

Then, by further moving the path member UP3 in the direction indicated by the outlined arrow, a bottom surface of the recess of the positioning section UPr is brought into contact with the attachment section UPd. Then, the path member UP3 is rotated about the attachment section UPd in a direction indicated by a black arrow. By this, as shown in FIG. 20, the fixed hook UPt is hooked on the attachment section UPe, and the positioning section UPs comes into contact with the attachment section UPe, whereby the path member UP3 is attached to the attachment sections UPd, UPe. A direction indicated by the black arrow is a direction intersecting the X-axis direction.

For example, when the path member UP3 is to be removed from the attachment sections UPd, UPe, the fixed hook UPt is released from the attachment section UPe by pinching the handle section UPu of the path member UP3 and pulling the path member UP3 in a direction opposite to the direction of the black arrow shown in FIG. 19. Then, by moving the path member UP3 in the direction opposite to the direction of the outlined arrow shown in FIG. 19, the path member UP3 is removed from the attachment sections UPd, UPe.

The path members UP1, UP2, UP4, UP5, UP6 have the same configuration as that of the path member UP3. Accordingly, the path members UP1, UP2, UP3, UP4, UP5, UP6, which are the plurality of path members UP, are detachably provided to the attachment section UPd, UPe in a direction intersecting the X-axis direction, which is the path width direction of the inversion path 26. Therefore, in the present embodiment, when one of the plurality of path members UP is attached to or detached from the attachment sections UPd, UPe, it is not necessary to detach the other path members UP from the attachment sections UPd, UPe. The path members UP1, UP2, UP3, UP4, UP5, UP6 are provided in the inversion path 26 constituting the transport path 21 such that their positions can be mutually switched. In other words, the path members UP are provided in the transport path 21 so that they can be mutually switched with each other.

In the present embodiment, the positions of the path members UP in the X-axis direction are fixed by attaching the six path members UP1, UP2, UP3, UP4, UP5, UP6 to the attachment sections UPd, UPe. On the other hand, as shown in FIG. 18, when any one of the plurality of path members UP is detached from the attachment sections UPd, UPe, the other path members UP attached to the attachment sections UPd, UPe are slidable in the X-axis direction with respect to the attachment sections UPd, UPe.

As described above, according to the transport path 21 and the recording device 10 according to the first embodiment, the following effects can be obtained.

The transport path TR is a transport path TR for transporting the medium P in the transport direction, the transport path TR including the path members XP that guide the medium P and that are arranged in the X-axis direction, which intersects the transport direction, wherein the path members XP are provided so that their positions are switchable with each other.

In the medium P transported on the transport path TR, the edge of the medium P in the path width direction tends to rub against the path member XP, and the central portion in the path width direction does not tend to rub against the path member XP. For this reason, in the path member XP, a degree of wear of the path member XP or adhesion of paper powder to the path member XP may differ between a portion through which the edge of the medium P of a frequently used size passes and a portion other than that portion. In contrast, according to the transport path TR of the present embodiment, it is possible to suppress a decrease in the transport performance of the medium P in the transport path TR by switching the positions of the path members XP in accordance with the degree of wear or adhesion of paper powder of each path member XP. That is, it is possible to suppress a decrease in the transport performance of the medium P in the transport path TR, without replacing a portion of the path member XP that does not needs to be replaced.

The plurality of path members XP have a same shape.

According to this configuration, even when the positions of the path members XP can be switched with each other, configuration of the transport paths TR is less likely to be complicated.

The path member XP includes an assembling section FPg and an assembled section FPh and two of the path members XP are defined as the path member FP1 and the path member FP3, and when the path member FP3 is arranged at an adjacent position adjacent to the path member FP1, which is arranged at a predetermined position, the assembling section FPg of the path member FP3 is assembled to the assembled section FPh of the path member FP1.

According to this configuration, when the assembling direction with the path member FP1 is correct, the path member FP3 can be arranged in the adjacent position, so that it is possible to suppress the path member FP from being assembled in an incorrect assembling direction.

The transport path TR further includes the adjacent section FPa that is adjacent to the predetermined position at which the path member XP is arranged in the path width direction and that includes the assembled section FPf, wherein the path member XP includes the assembling section FPg and when one of the path members XP is defined as the path member FP1 and the path member FP1 is arranged at the predetermined position, the assembling section FPg of the path member FP1 is assembled to the assembled section FPf of the adjacent section FPa.

According to this configuration, when the assembling direction with the adjacent section FPa is correct, the path member FP1 can be arranged in the predetermined position, so that it is possible to suppress the path member FP from being assembled in an incorrect assembling direction.

The transport path TR further includes an attachment section FPd, FPe to which the path members XP are configured to attach to and detach from, wherein the path members XP are configured to slide in the X-axis direction with respect to the attachment sections FPd, FPe.

According to this configuration, the path members XP can have their positions switched by sliding and removing the path members XP with respect to the attachment sections FPd, FPe, and changing the attachment order of the path members XP.

The transport path TR further includes the attachment sections UPd, UPe to which the path members XP are configured to attach to and detach from, wherein the path members XP are configured to attach and detach with respect to the attachment sections UPd, UPe in the direction intersecting the X-axis direction.

According to this configuration, since the path member XP is attachable and detachable in the direction intersecting with the path width direction, the path members XP can have their positions switched by attaching and detaching the path member XP to be switched to and from the attachment sections UPd, UPe.

The path member XP has a roller 34*b* for transporting the medium P.

According to this configuration, by switching the positions of the path members XP or replacing the path member XP, it is possible to switch or replace the roller 34*b* in which wear, adhesion of paper powder, contamination, or the like has progressed.

The recording device 10 includes the transport path TR; the recording section 18 for performing recording on the medium P transported along the transport path TR; and the control section 15, wherein the control section 15 calculates the deterioration degree D of performance of guiding the medium for each of the plurality of path members XP on the basis of recording information RI related to a specification of the recording and in a case where the plurality of path members XP includes a set-value-exceeded path member EX, in which the deterioration degree D exceeds a set value SV, and a set-value-not-exceeded path member NEX, in which the deterioration degree D does not exceed the set value SV, then the control section 15 performs a notification SC to prompt switching of the set-value-exceeded path member EX and the set-value-not-exceeded path member NEX.

According to this configuration, by performing the notification SC, the user can easily switch the positions of the path members XP.

In the notification SC, the control section 15 prompts switching of the set-value-exceeded path member EX with the set-value-not-exceeded path member NEX having the smallest deterioration degree D of the plurality of path members XP.

According to this configuration, by switching the positions of the path members XP, it is easy to suppress a decrease in the transport performance of the medium P in the transport path TR. Therefore, it is possible to suppress a decrease in the recording quality of the recording device 10 and to further extend the usable period of the recording device 10.

The recording information RI includes at least one of the type of the medium P, the recording speed, which is the time required for the recording on the medium P, the recording density which is the degree of the amount of the color material adhering to the medium P in the recording on the medium P, or environmental information related to the use environment when the recording is performed.

According to this configuration, by calculating the deterioration degree D according to the recording information RI, it is possible to predict the appropriate timing for switching the positions of the path members XP.

The recording information RI includes information on the medium P in which a transport failure has occurred in the transport path TR.

For example, if the performance of guiding the medium P in the path member XP deteriorates further, a transport failure of the medium P is likely to occur. Therefore, since the recording information RI includes the information of the medium P in which the transport failure has occurred in the transport path TR, it is possible to predict a more appropriate timing for switching the positions of the path members XP.

The plurality of path members XP are provided with a mark M to identify each of the path members XP and the control section 15 uses the mark M to perform the notification SC that the set-value-exceeded path member EX and the set-value-not-exceeded path member NEX are to be switched.

By this, the user can easily recognize the path members XP to be switched.

The recording device 10 further includes the display panel 19 which performs the notification SC.

According to this configuration, the user can switch the positions of the path members XP while confirming the information displayed on the display panel 19.

Although the transport path 21 and the recording device 10 according to the above embodiment of the present disclosure basically have the above-described configuration, it is of course possible to change or omit the partial configuration within the scope not departing from the gist of the present disclosure. In addition, the above-described embodiments and other embodiments described below can be implemented in combination with each other within a range that does not technically conflict. Other embodiments will be described below.

Figure 22:
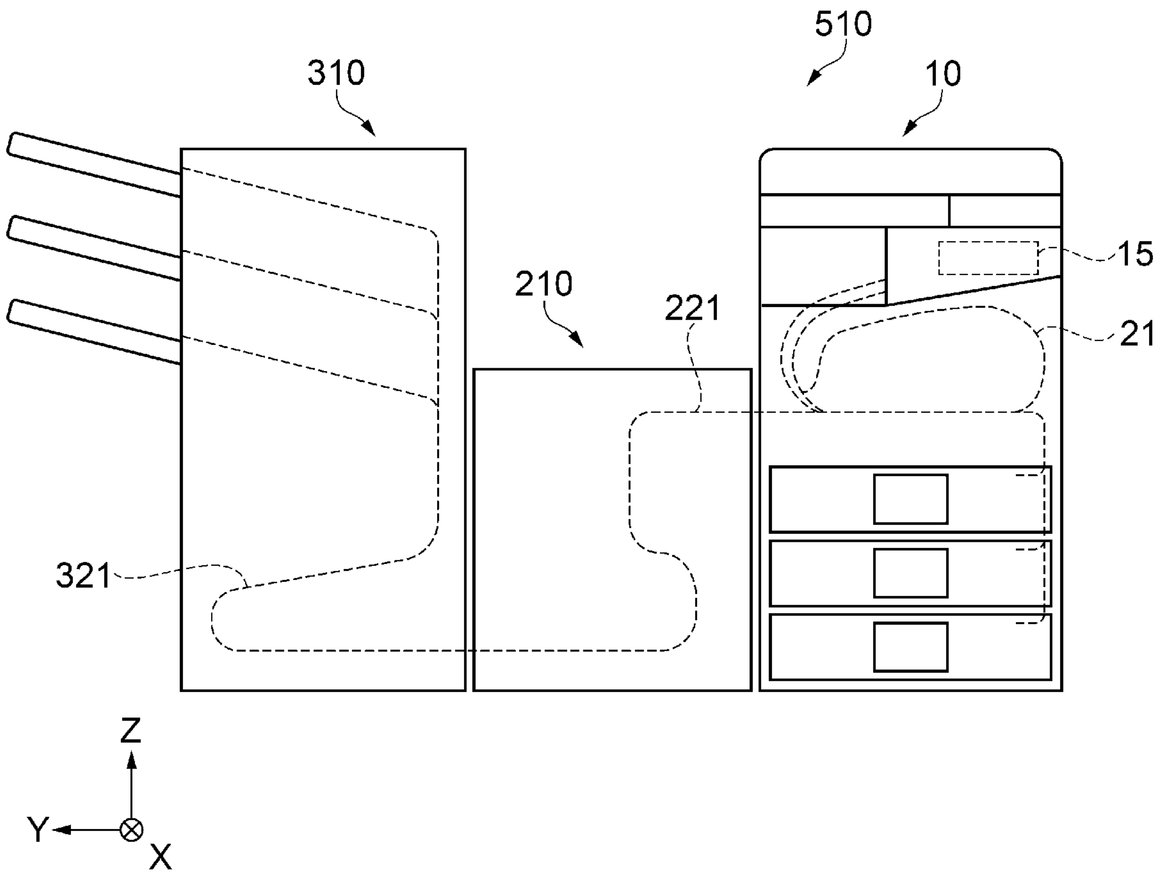
FIG. 22 is a schematic diagram showing configuration of a recording system.

In a case where recorded media P are to be collectively stapled or punched in units of copies, then as shown in FIG. 22, the recording device 10 of the above-described embodiment may be applied to a recording system 510 including a transport device 210 including a transport path 221 for transporting the recorded media P and a finisher 310 for collectively stapling or punching the recorded media P transported by the transport device 210 in units of copies. In this case, the control section 15 included in the recording device 10 may control the recording device 10, the transport device 210, and the finisher 310.

The transport path 221 included in the transport device 210 may include configuration similar to configuration included in the transport path 21 and the path member XP included in the transport path 21. In this case, the transport path 221 is an example of the transport path TR. In other words, the transport device 210 is a transport device 210 for transporting the medium P recorded by the recording device 10, and includes the transport path TR. According to this configuration, by switching the positions of the path members XP in the transport path TR, it is easy to suppress a decrease in the transport performance of the medium P in the transport device 210 without replacing a portion of the path member XP that does not needs to be replaced.

In this case, the recording system 510 includes the recording device 10 for recording on the medium P; the transport device 210 that transports the medium P recorded by the recording device 10 and that includes the transport path TR; and a control section 15 for controlling the recording device 10 and the transport device 210. According to this configuration, the transport device 210 includes the transport path TR having the path member XP. Therefore, by switching the positions of the path members XP in the transport path TR, it is easy to suppress a decrease in the transport performance of the medium P in the recording system 510 without replacing a portion of the path member XP that does not need to be replaced.

In this case, a transport path 321 included in the finisher 310 may include configuration similar to configuration included in the transport path 21 and the path member XP included in the transport path 21. In this case, the transport path 321 is an example of the transport path TR.

In the embodiment described above, configuration included in the transport path 21 and configuration similar to the path member XP included in the transport path 21 may be included in the scanner unit 14 included in the recording device 10 or a transport path that is included in a similar scanner and transports a document.

Figure 21:
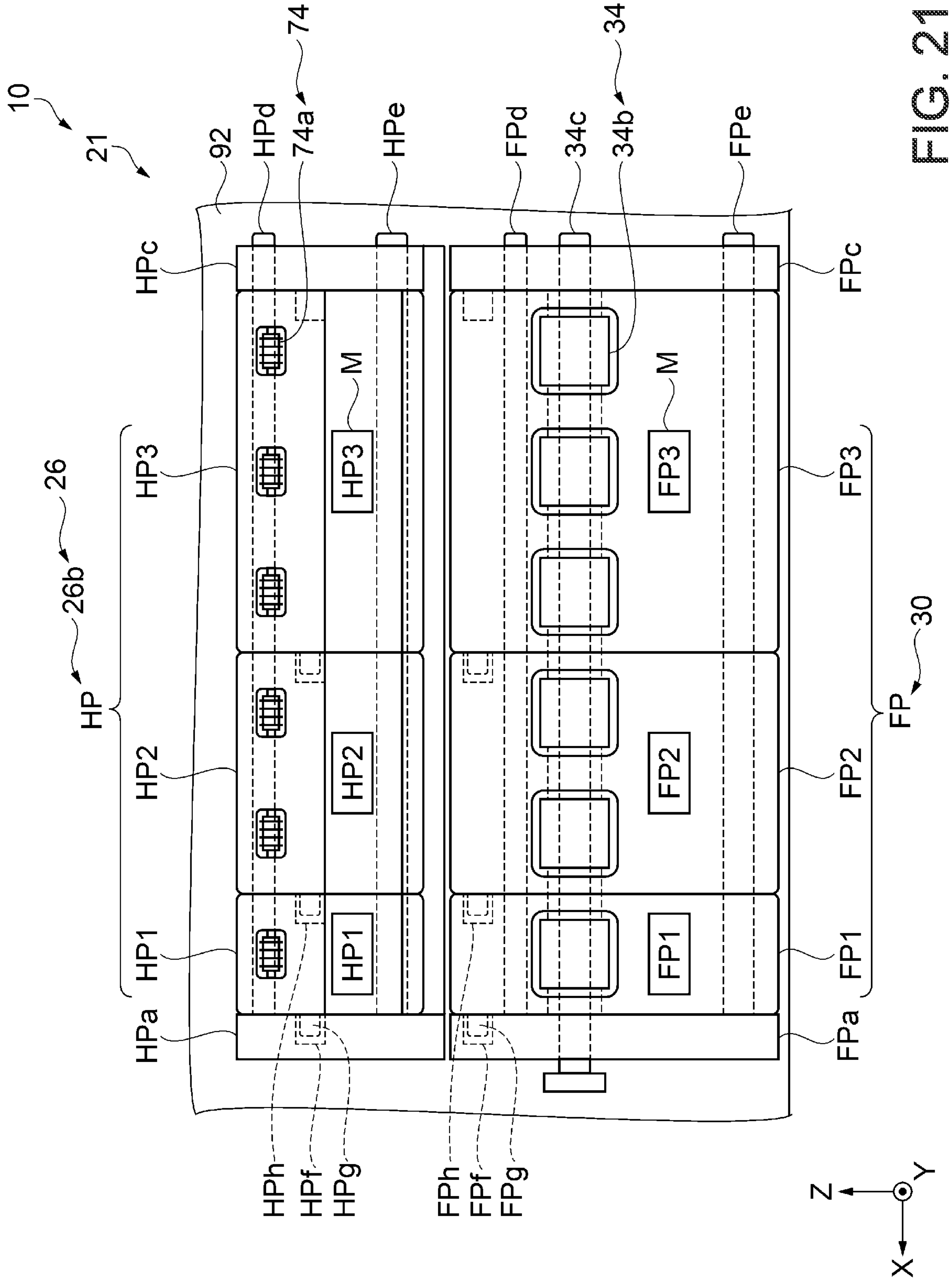
FIG. 21 is a schematic diagram showing another embodiment of the path member.

In the embodiment described above, the transport path TR may not have six path members XP in the X-axis direction. For example, as shown in FIG. 21, the transport path TR may have three path members XP in the X-axis direction. For example, the transport path TR may have two path members XP in the X-axis direction, which is the path width direction of the transport path TR. In this case, by switching the positions of the two path members XP with each other, the positions of the two path members XP through which the X-axis direction edge of the medium P passes are made different in the X-axis direction from the positions before the positions of the two path members XP are switched with each other, and thus it is possible to suppress a decrease in the transport performance of the medium P in the transport path TR.

In the embodiment described above, the plurality of path members XP may not have a same shape. For example, as shown in FIG. 21, the path members HP1, HP2, HP3 or the path members FP1, FP2, FP3, which are the plurality of path members XP, may have different widths in the X-axis direction. Also in this case, for example, by switching a path member FP1 and a path member FP3 of the three path members FP1, FP2, FP3, the positions through which the X-axis direction edge of the medium P passes in each of the three path members XP are made different in the X-axis direction from those before switching the path member FP1 and the path member FP3, and thus it is possible to suppress a decrease in the transport performance of the medium P in the transport path TR.

The positions at which all of the plurality of path members XP are provided may not be switchable with each other. For example, as shown in FIG. 17, among the path members UP1, UP2, UP3, UP4, UPS, UP6, which are the plurality of path members UP constituting the upper area **26*a* of the inversion path 26, the path member UP3 may not be removable from the attachment sections UPd, UPe. In this case, the path member UP3** need not include the mark M.

In the embodiment described above, the control section 15 may calculate the deterioration degree D of the performance of guiding the medium P for each of the plurality of path members XP, and when there is no set-value-not-exceeded path member NEX in the plurality of path members XP, then the control section 15 may perform notification SC that the positions of the path members XP cannot be switched, requesting that the user take action. Further, at the timing of when only one of path members XP remains a set-value-not-exceeded path member NEX, the control section 15 may perform notification SC to the effect that switching of the positions of the path members XP cannot be performed once the last set-value-not-exceeded path member NEX becomes a set-value-exceeded path member EX, and request the user to take action in advance. Specific examples of the action include purchasing a new path member XP, cleaning of the path member XP, and contacting a service man for replacement of the recording device 10 or replacement of the transport path TR.

In the embodiment described above, the recording device 10 may not include the display panel 19. In this case, the control section 15 may perform the notification SC for displaying information relating to the state of the recording device 10 on a display section of an external device (not shown) through a communication interface, a communication cable, a wireless communication line, or the like (none of which are shown) provided in the recording device 10. Examples of the external device include a personal computer, a smartphone, a mobile phone, and a portable information terminal.

In the embodiment described above, any of the path member FP, the path member HP, and the path member DP may have the same configuration as the path member UP. For example, in a case where the path member DP has the same configuration as the path member UP, then the path members DP1, DP2, DP3, DP4, DP5, DP6 are provided so as to be attachable to and detachable from the attachment sections DPd, DPe in a direction intersecting the X-axis direction which is the path-width direction of the face down discharge path 28. In this case, attachment and detachment of the path member DP with respect to the attachment sections DPd, DPe are performed from the +Y direction side of the path member DP in a state in which the opening and closing cover 102 of the slide section 94 is open.

As long as the transport path TR and the plurality of path members XP described in the above embodiment are provided, the recording device 10 may not be an ink jet printer. For example, the recording device 10 may be a laser printer in which toner powder is melted by heat and fixed to the medium P.

What is claimed is:

1. A transport path for transporting a medium in a transport direction, the transport path comprising:

path members that guide the medium and that are arranged in a path width direction of the transport path, which intersects the transport direction, each path member being configured to selectively interlock within an adjacent path member of the path members with positions of the path members being interchangeable in the path width direction.

2. The transport path according to claim 1, wherein the path members have a same shape.

3. The transport path according to claim 1, wherein the path members include an assembling section and an assembled section and two of the path members are defined as a first path member and a second path member, and the assembling section of the second path member is assembled with the assembled section of the first path member when the second path member is arranged at an adjacent position that is adjacent to the first path member arranged at a predetermined position.

4. The transport path according to claim 1, further comprising:

an adjacent section that is adjacent to a predetermined position where the path members are arranged in the path width direction and that includes an assembled section, wherein the path member includes an assembling section and when one of the path members is defined as a first path member and the first path member is arranged at the predetermined position, the assembling section of the first path member is assembled to the assembled section of the adjacent section.

5. The transport path according to claim 1, further comprising:

an attachment section to which the path members are configured to attach and detach, wherein the path members are configured to slide in the path width direction with respect to the attachment section.

6. The transport path according to claim 1, further comprising:

an attachment section to which the path members are configured to attach and detach, wherein the path members are configured to attach and detach in a direction intersecting the path width direction with respect to the attachment section.

7. The transport path according to claim 1, wherein the path member includes a transport section for trans-porting the medium.

8. A recording device comprising:

the transport path according to claim 1;

a recording section for performing recording on the medium transported along the transport path; and a control section, wherein the control section calculates a deterioration degree of performance of guiding the medium for each of the path members on the basis of recording information related to a specification of the recording and in a case where the path members include a set-value-exceeded path member, in which the deterioration degree exceeds a set value, and a set-value-not-exceeded path member, in which the deterioration degree does not exceed the set value, then the control section performs a notification to prompt switching of the set-value-exceeded path member and the set-value-not-exceeded path member.

9. The recording device according to claim 8, wherein in the notification, the control section prompts switching of the set-value-exceeded path member with a set-value-not-exceeded path member having a smallest deterioration degree among the path members.

10. The recording device according to claim 8, wherein the recording information includes at least one of a type of the medium, a recording speed, which is a time required for the recording on the medium, a recording density, which is a degree of an amount of a color material adhering to the medium in the recording on the medium, and environmental information related to a use environment when the recording is performed.

11. The recording device according to claim 8, wherein the recording information includes information on the medium on which a transport failure has occurred in the transport path.

12. The recording device according to claim 8, wherein the path members are each provided with a mark to identify the path members and the control section uses the marks to perform the notification for the set-value-exceeded path member and the set-value-not-exceeded path member to be switched.

13. The recording device according to claim 8, further comprising:

a notification section which performs the notification.

14. A recording system comprising:

a recording device for recording on a medium;

a transport device that transports the medium recorded by the recording device and that includes the transport path according to claim 1; and a control section for controlling the recording device and the transport device.

15. A transport device for transporting a medium recorded by a recording device, the transport device comprising:

a transport path, the transport path comprising:

path members that guide the medium and that are arranged in a path width direction of the transport path, which intersects the transport direction, each path member being configured to selectively interlock within an adjacent path member of the path members with positions of the path members being interchangeable in the path width direction.

* * * * *